United States Patent
Sakura

(10) Patent No.: US 8,310,701 B2
(45) Date of Patent: Nov. 13, 2012

(54) PRINT SYSTEM HAVING PRINTER DRIVERS THAT ARE INSTALLED IN SERVER DEVICE AND CLIENT-TERMINAL DEVICE AND THAT RESTRICT PRINT FUNCTIONS, CLIENT-TERMINAL DEVICE, AND PRINT-CONTROL METHOD

(75) Inventor: Masayuki Sakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1035 days.

(21) Appl. No.: 12/270,704

(22) Filed: Nov. 13, 2008

(65) Prior Publication Data

US 2009/0128849 A1 May 21, 2009

(30) Foreign Application Priority Data

Nov. 15, 2007 (JP) ................. 2007-297122

(51) Int. Cl.
 G06F 3/12 (2006.01)
 G06K 1/00 (2006.01)
 G06K 15/00 (2006.01)
(52) U.S. Cl. ....... 358/1.15; 358/1.9; 358/1.14; 719/319; 719/321
(58) Field of Classification Search ............... 358/1.14, 358/1.9, 1.15; 719/319, 321
See application file for complete search history.

(56) References Cited

U.S. PATENT DOCUMENTS

| | | | | |
|---|---|---|---|---|
| 2003/0103224 | A1* | 6/2003 | Johnson et al. | 358/1.13 |
| 2004/0017580 | A1* | 1/2004 | Kuroda | 358/1.13 |
| 2005/0134896 | A1* | 6/2005 | Koga | 358/1.14 |
| 2007/0229886 | A1* | 10/2007 | Sakurai | 358/1.15 |

FOREIGN PATENT DOCUMENTS

| | | |
|---|---|---|
| JP | 2005-165844 | 6/2005 |
| JP | 2006-172093 | 6/2006 |

* cited by examiner

Primary Examiner — Thomas Lett
(74) Attorney, Agent, or Firm — Canon USA Inc IP Division

(57) ABSTRACT

A terminal-server-printer driver generates job-ticket data including function-restriction information set by a manager. Upon receiving a print instruction, the job-ticket data is added to print-job data and the print-job data is transmitted to a print-control module. The print-control module selects a first printer driver and/or a second printer driver for processing based on details on the print-job data, and outputs the print-job data and the job-ticket data in accordance with the first printer driver and/or the second printer driver. The first printer driver and/or the second printer driver rewrites the print-attribute settings thereon without fail on the basis of the job-ticket data, and transmits drawing data generated on the basis of the rewritten print-attribute settings to a printer.

11 Claims, 29 Drawing Sheets

```
1201:  <Feature name="FunctionConstraints">
1202:    <Property name="AccountManagement">
1203:      <Value> true </Value>
1204:    </Property>
1205:    <Property name="PageLayout">
1206:      <Value> 2-up </Value>
1207:    </Property>
1208:    <Property name="Duplex">
1209:      <Value> duplex </Value>
1210:    </Property>
1211:  </Feature>
```

FIG. 12

```
2001: <Feature name="FunctionConstraints">
2002:   <Property name="AccountManagement">
2003:     <Value> true </Value>
2004:   </Property>
2005:   <Property name="PageLayout">
2006:     <Value> 2-up </Value>
2007:   </Property>
2008:   <Property name="Duplex">
2009:     <Value> duplex </Value>
2010:   </Property>
2011: </Feature>
2012: <Feature name="JobID">
2013:   <Property name="JobIDbyNumber">
2014:     <Value> 1234abcd </Value>
2015:   </Property>
2016: </Feature>
```

FIG. 20

PRINT SYSTEM HAVING PRINTER DRIVERS THAT ARE INSTALLED IN SERVER DEVICE AND CLIENT-TERMINAL DEVICE AND THAT RESTRICT PRINT FUNCTIONS, CLIENT-TERMINAL DEVICE, AND PRINT-CONTROL METHOD

BACKGROUND OF THE INVENTION

1. Field of the Invention

The present invention relates to a print system, a client-terminal device, and a print-control method, and is particularly suitable for a print system including a server device and the client-terminal device, where a printer driver is installed in each of the server device and the client-terminal device.

2. Description of the Related Art

Heretofore, the following method has been used when a user prints a document in an environment (a print system) including a terminal server and a client terminal. First, the client terminal connects with the terminal server on the basis of an operation performed by the user. Next, the terminal server starts an application installed therein, and opens document data. Then, the user selects printing from an application menu displayed on the client terminal. At that time, a printer driver installed in the terminal server is used, and the user makes print-attribute settings and/or issues a print instruction through the printer driver. Actual print-job data is generated by the printer driver installed in the terminal server and transmitted to a printer.

In the above-described print system, the manager of the print system often wishes to restrict a function executed when the user issues a print instruction to a predetermined function. For example, the manager often wishes to print data on the basis of print settings indicating "2 in 1 and duplex" at all times, so as to reduce the number of output sheets. For the above-described print system, the manager makes settings so that printing is performed on the basis of the print settings indicating "2 in 1 and duplex" at all times through the printer driver installed in the terminal server. Due to the above-described settings, the terminal server uses a printer driver on which print-function restriction is imposed irrespective of what client terminal connects with the terminal server. Therefore, once the print-function restriction is imposed on the terminal server, the print-function restriction can be imposed on the terminal of each user.

Incidentally, there is another print system including the terminal server and the client terminal, as shown below. In the above-described print system, an application and a printer driver that are used by the user are installed in the terminal server. A printer driver is also installed in the client terminal, and a printer is connected to the client terminal. If the client terminal connects with the terminal server and a print instruction is issued from the application of the terminal server in the above-described configuration, printing is performed in accordance with the flow described below.

First, the application of the terminal server transmits print-job data to the printer driver of the terminal server. Next, the printer driver of the terminal server transmits the transmitted print-job data to the client terminal. On the client-terminal side, a print-job-reception unit receives the print-job data. The print-job-reception unit transmits the print-job data to the printer driver of the client terminal. Subsequently, the printer driver of the client terminal converts the print-job data into drawing data that can be interpreted by the printer, as required, and transmits the print-job data (and/or drawing data) to the printer. The printer prints and outputs data by using the print-job data and/or the drawing data.

However, it is difficult for the print system taking the above-described new form to perform the print-function restriction, which is achieved in the formerly described print system that has been heretofore used. Namely, in the print system that has been heretofore used, when the print-function restriction is set through the printer driver installed in the terminal server, the print-function restriction can be performed for every client terminal. However, since the printer driver installed in the client terminal is used in the print system taking the new form, the user of each client terminal can change the settings on the printer driver without restraint.

Therefore, there has been a known technology used to perform the print-function restriction for the user of the client terminal provided in the print system taking the above-described new form, which is disclosed in Japanese Patent Laid-Open No. 2006-172093, for example. A server includes a restriction-information-storage unit configured to store data on the account of a user and restriction information after associating the account data with the restriction information, and a driver-storage unit configured to store the driver of each printer. The server receives the account data transmitted from the client terminal and reads the restriction information corresponding to the account data from the restriction-information-storage unit. Then, the server transmits the restriction information to the client terminal, installs a printer driver that can be used by the client terminal on the basis of the restriction information, and permits the use of the printer driver. According to the above-described technology, the server owns restriction information of each of the accounts of client terminals, where the restriction information indicates whether the printer can be used or not. Therefore, it has been difficult to restrict the functions of individual printers.

Japanese Patent Laid-Open No. 2005-165844 discloses the following technology. In a document-print system including a client terminal and a printer, the client terminal adds print-control information including information about restrictions imposed on document printing and instruction information used to print a predetermined image to document data, and transmits the document data. The printer prints the document data in accordance with restriction information and prints a predetermined image on the basis of the document data and the print-control information that are transmitted from the client terminal. According to the above-described technology, the restriction information indicates whether the printing is performed or not.

According to the above-described known technologies, however, for restricting the print function in the print system which takes the new form so that the printer driver is installed in each of the terminal server and the client terminal, the following problems arise. That is to say, settings of the print-function restriction should be made through the printer driver installed in each client terminal, so as to restrict the print function. Therefore, restricting the print function is achieved at much expense in time and effort of the manager of the print system. Further, restricting the print function through the printer driver of the client terminal may require the manager's authority, and setting the above-described authority is also achieved at much expense in time and effort. Further, changing the details on the settings of the print-function restriction may also require the same trouble as that taken at the time when the former settings of the print-function restriction are made, which increases the management cost.

SUMMARY OF THE INVENTION

The present invention is directed to a print system that makes it easier to restrict the print function in which a printer driver is installed in each of a server device and a client-terminal device.

A print system according to an aspect of the present invention includes a server device, a client-terminal device connected to the server device so that the client-terminal device and the server device can communicate with each other, and a print device connected to the client-terminal device so that the print device and the client-terminal device can communicate with each other. A printer driver installed in the server device includes a generation unit configured to generate a print job including function-restriction information used to restrict a print function. A printer driver, installed in the client-terminal device, includes a processing unit configured to process the print job in accordance with a restriction imposed on the print function, where the restriction is imposed based on the function-restriction information included in the print job transmitted from the server device.

A client-terminal device according to another aspect of the present invention includes a transmission unit configured to transmit a print job, received from a server device, to an operating-system-drawing-conversion module, an extraction unit configured to extract function-restriction information of the print job from a job ticket including the function-restriction information, and a transmission unit configured to transmit the extracted function-restriction information to an operating-system-drawing driver.

A client-terminal device according to another aspect of the present invention includes an identification unit configured to identify whether a target driver is an operating-system-drawing driver or a general-purpose-format driver, and a transmission unit configured to transmit a print job, transmitted from a server device, to an operating-system-drawing-conversion module, extract function-restriction information of the print job from a job ticket including the function-restriction information, and transmit the extracted function-restriction information to the operating-system-drawing driver when the identification unit identifies the target driver as the operating-system-drawing driver. The transmission unit is also configured to transmit the print job transmitted from the server device to the general-purpose-format driver when the identification unit identifies the target driver as the general-purpose-format driver.

A print-control method according to another aspect of the present invention includes generating, via a printer driver installed in a server device, a print job including function-restriction information used to restrict a print function, transmitting the generated print job to a client-terminal device, and processing, via a printer driver installed in the client-terminal device, the print job in accordance with restriction of the print function, where the print-function restriction is achieved based on the function-restriction information included in the print job transmitted at the transmitting step.

A print-control method according to another aspect of the present invention includes transmitting a print job received from a server device to an operating-system-drawing-conversion module, extracting function-restriction information of the print job from a job ticket including the function-restriction information, and transmitting the extracted function-restriction information to an operating-system-drawing driver.

Another print-control method according to another aspect of the present invention includes identifying whether a target driver is an operating-system-drawing driver or a general-purpose-format driver, transmitting a print job transmitted from a server device to an operating-system-drawing-conversion module, extracting function-restriction information of the print job from a job ticket including the function-restriction information, transmitting the extracted function-restriction information to the operating-system-drawing driver when the target driver is identified as the operating-system-drawing driver at the identification step, and transmitting the print job, transmitted from the server device, to the general-purpose-format driver when the target driver is identified as the general-purpose-format driver at the identifying step.

A storage medium storing a computer program making a computer execute the above-described print-control method.

A storage medium storing a computer program making a computer execute the above-described another print-control method.

Further features of the present invention will become apparent from the following description of exemplary embodiments with reference to the attached drawings.

BRIEF DESCRIPTION OF THE DRAWINGS

FIG. 12 is a diagram showing example job-ticket data including data on the content of the function-restriction information according to the first embodiment.

FIG. 20 is a diagram showing example function-restriction-job-ticket data to which job-ID data is added according to the first embodiment.

DESCRIPTION OF THE EMBODIMENTS

First Embodiment

A first embodiment of the present invention will be described with reference to the attached drawings.
[Configuration of Print System]

Figure 1:
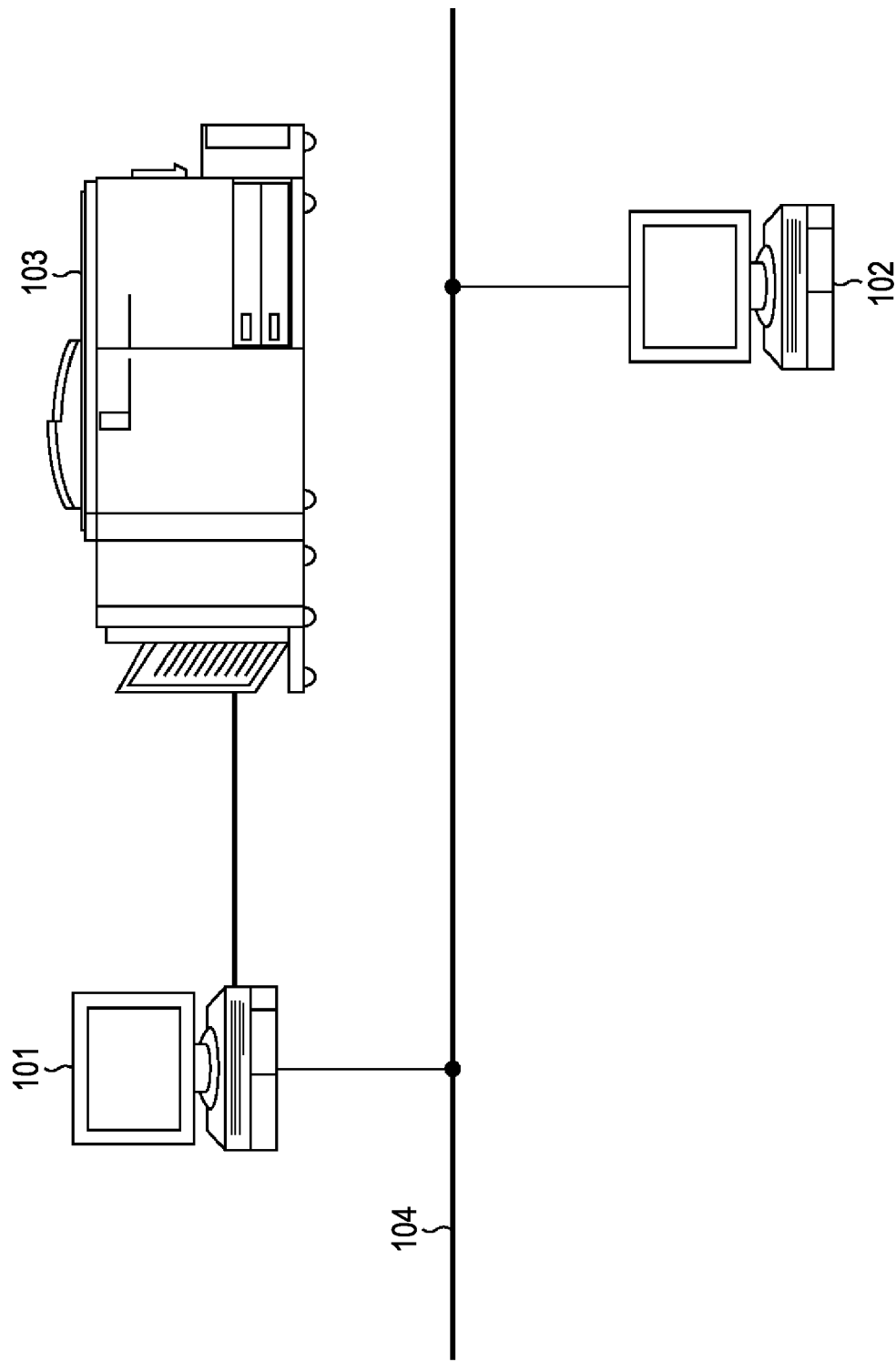
FIG. 1 shows a first configuration of a print system according to a first embodiment of the present invention.

FIG. 1 shows a first configuration of a print system including a terminal server 101, a client terminal 102, and a printer 103. A communication medium 104 is a local-area network (LAN) provided to connect the terminal server 101 to the client terminal so that they can communicate with each other. Each of the terminal server 101 and the client terminal 102 can be achieved by using a computer apparatus such as a personal computer (PC).

In the print system shown in FIG. 1, the printer 103 is connected to the terminal server 101 in a communicable manner. Although FIG. 1 shows the only one client terminal 102 for the sake of simplicity, a plurality of the client terminals 102 is provided in ordinary cases. The client terminal 102 connects with the terminal server 101 on the basis of an operation performed by a user. Applications and a printer driver used for printing are installed in the terminal server 101. Namely, when the user instructs the print system to perform printing, the following operations are performed.

First, the user selects printing from an application menu displayed by the application installed in the terminal server 101 by operating the client terminal 102. The application transmits print data to the printer driver installed in the terminal server 101 on the basis of the above-described instruction. The printer driver converts the print data into print code that can be interpreted by the printer 103 and transmits the print code to the printer 103. The printer 103 draws the image of the transmitted print code, and prints and outputs the drawn image.

Figure 2:
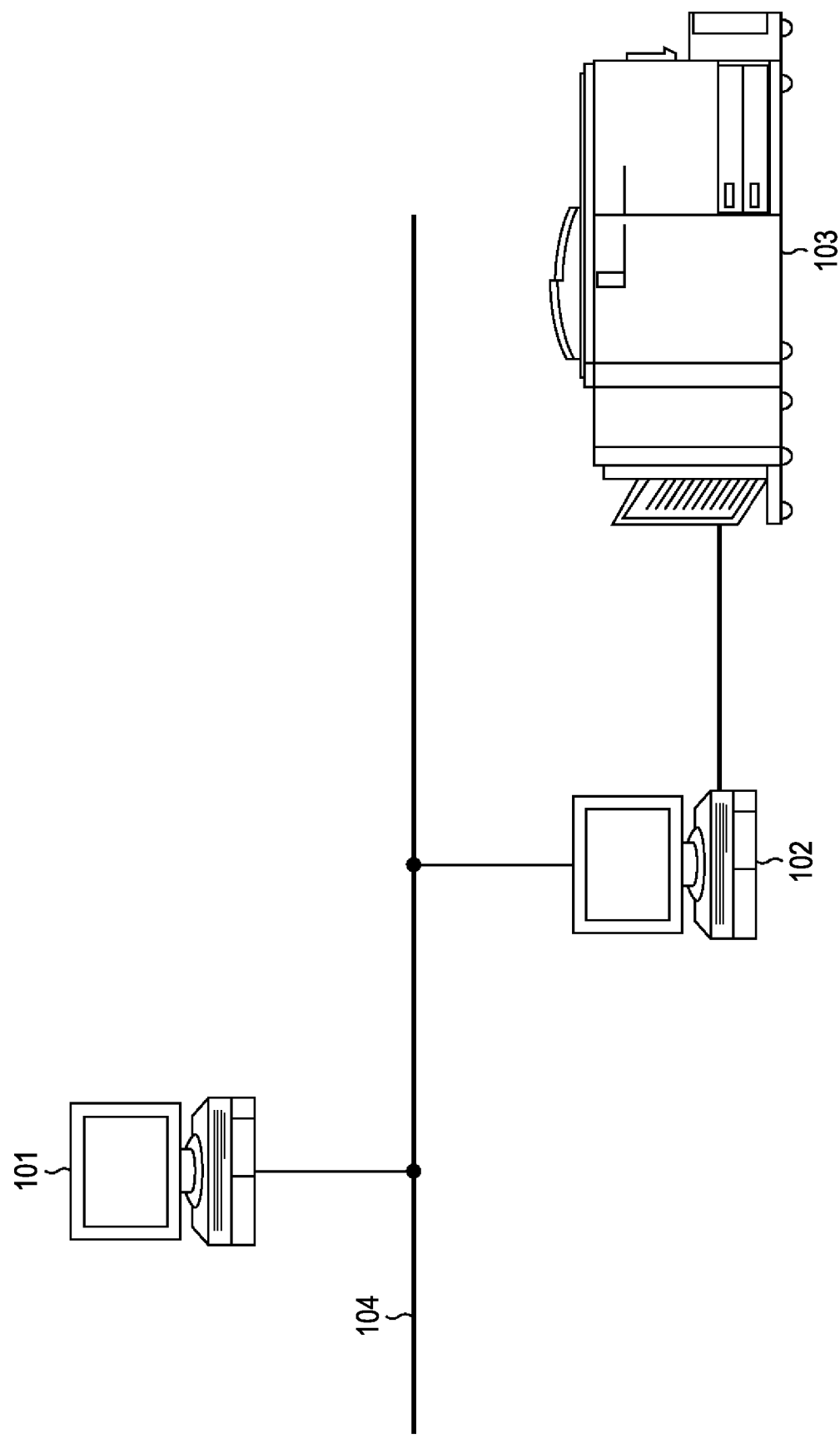
FIG. 2 shows a second configuration of the print system according to the first embodiment.

FIG. 2 shows a second configuration of the print system. In FIG. 2, the configurations of the terminal server 101 and the client terminal 102 are the same as those of the print system shown in FIG. 1. The print system shown in FIG. 2 is the same as that shown in FIG. 1 except that the printer 103 is connected to the client terminal and the printer driver is also installed in the client terminal. Namely, when the user instructs the print system to perform printing, the following operations are performed.

First, the user selects printing from an application menu displayed by the application installed in the terminal server 101 by operating the client terminal 102. The application transmits the print data to the client terminal 102 through the system of the terminal server 101 on the basis of the above-described instruction. The client terminal 102 converts the transmitted print data into print code that can be interpreted by the printer 103 by using the printer driver installed in the client terminal 102 and transmits the print code to the printer 103. The printer 103 draws the image of the transmitted print code, and prints and outputs the drawn image.

Thus, printing is performed in the print system including the terminal server 101 and the client terminal 102. The first embodiment is suitable for achieving the print system shown in FIG. 2, for example.
[Flow of Print Data Through Terminal Server/Client Terminal]

Figure 3:
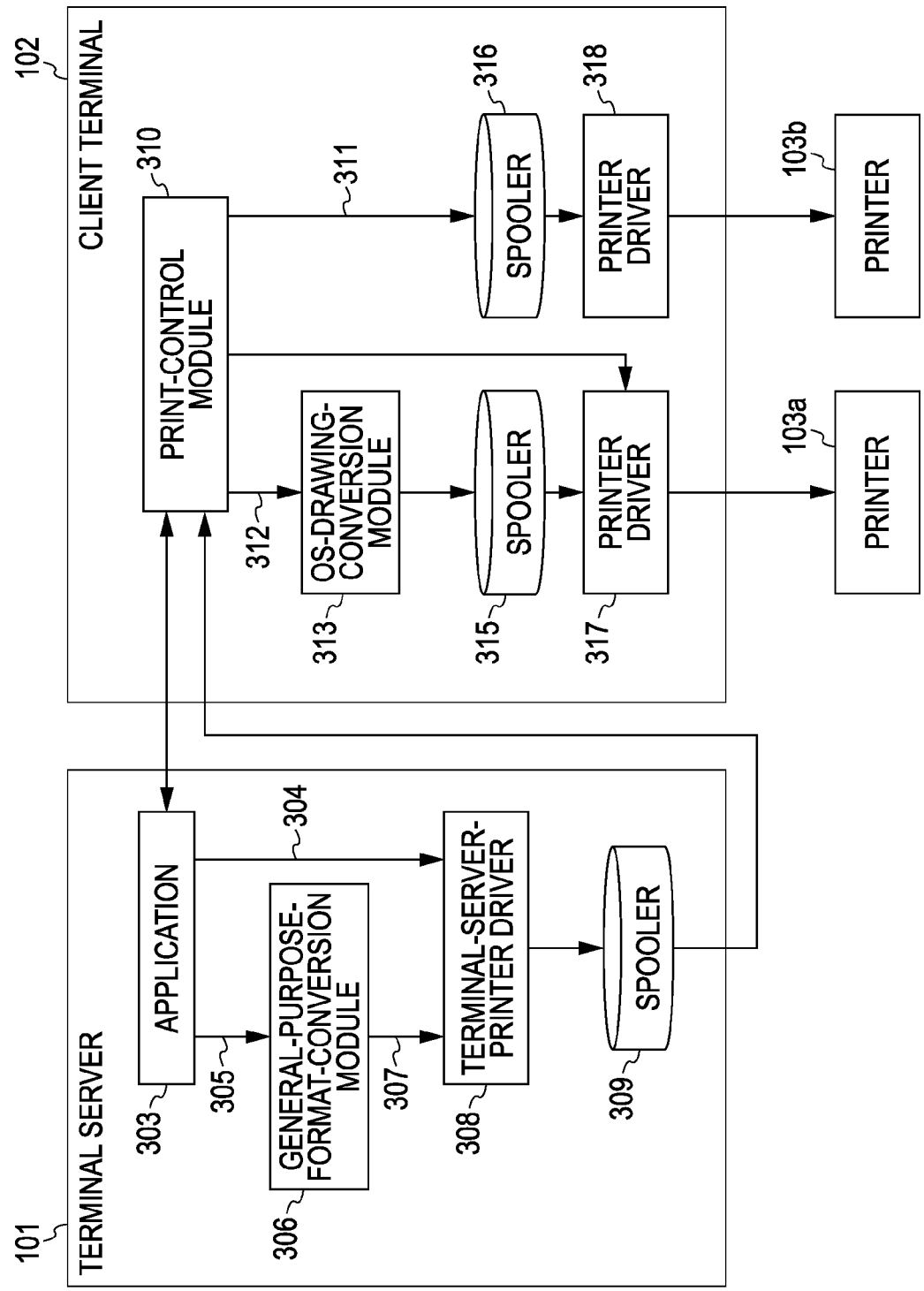
FIG. 3 shows an example functional configuration of the print system shown in FIG. 2 according to the first embodiment.

FIG. 3 shows an example functional configuration of the print system shown in FIG. 2. The configurations of functional blocks and the flow of the print data will be described with reference to FIG. 3. The individual units (functions) shown in FIG. 3 are achieved through software stored in a storage medium including a read-only memory (ROM), a hard-disk drive (HDD), etc. Here, it is assumed that the print data transmitted from the terminal server 101 to the client terminal 102 is data generated in a general-purpose format. The general-purpose format includes, for example, XML Paper Specification (XPS), which is a platform-independent document format, of Microsoft (registered trademark) Corporation.

Further, the above-described applications include an application that can generate data in the general-purpose format such as XPS. In addition to that, the above-described applications include an application that can generate the print data by using drawing mode used in an operating system (OS). For example, the drawing mode includes Graphic Device Interface (GDI) of Microsoft (registered trademark) Corporation. In the above-described embodiment, both the print data generated in the general-purpose format and the print data generated in the drawing mode used in the OS are used. Hereinafter, the print data generated in the general-purpose format is referred to as general-purpose-format print data and the print data generated in the drawing mode used in the OS is referred to as OS-drawing print data.

First, two types of applications (application programs) 303 used by the client terminal 102 are installed in the terminal server 101. Namely, as described above, one of the applications 303 is provided to generate general-purpose-format print data 304 and the other is provided to generate OS-drawing-print data 305. The general-purpose-format print data 304 is submitted to a terminal-server-printer driver 308 installed in the terminal server 101. The submitted general-purpose-format print data 304 is transmitted to the client terminal 102 through a spooler 309.

Further, the OS-drawing-print data 305 is converted into the general-purpose-format print data 307 through a general-purpose-format-conversion module 306 and submitted to the terminal-server printer driver 308. That is to say, the general-purpose-format-conversion module 306 is provided to convert GDI-compatible data into XPS-compatible data. The general-purpose-format print data 307 submitted to the terminal-server-printer driver 308 is transmitted to the client terminal 102 through the spooler 309.

The client terminal 102 includes a print-control module 310 configured to receive the general-purpose-format print data transmitted from the terminal server 101. Further, two types of printer drivers are installed in the client terminal 102. The two printer drivers include a printer driver (GDI driver) 317 that receives the OS-drawing print data obtained by converting the general-purpose-format print data 307, converts the OS-drawing print data into print data that can be interpreted by a printer 103a, and transmits the converted print data to the printer 103a, and a printer driver (XPS driver) 318 that receives and converts the general-purpose-format print data 304 into print data that can be interpreted by a printer 103b, and transmits the print data to the printer 103b.

In the latter case, the general-purpose-format print data may be directly rendered, and printed and output by the printer 103b. In that case, the printer driver 318 transmits the transmitted general-purpose-format print data 304 in its original form to the printer 103b. Thus, according to the first embodiment, the printer driver 317 achieves an OS-drawing driver and the printer driver 318 achieves a general-purpose-format driver.

The print-control module 310 controls the flow of the print data in synchronization with the printer drivers 317 and 318, and the printers 103a and 103b functioning as output destinations. In the case where the print data is output to the printer driver 318 configured to receive the general-purpose-format print data 304, the print-control module 310 submits the general-purpose-format print data 304 to the printer driver 318 through a path 311 via a spooler 316.

In the case where the general-purpose-format print data 307 generated on the basis of the OS-drawing print data 305 is transmitted to a printer driver functioning as the output destination, the print-control module 310 transmits the general-purpose-format print data 307 to an OS-drawing-conversion module 313 through a path 312. Namely, the OS-drawing-conversion module 313 converts the XPS-compatible data into the GDI-compatible data. The OS-drawing-conversion module 313 converts the general-purpose-format print data 307 into the OS-drawing print data and submits the OS-drawing print data to the printer driver (GDI driver) 317 through a spooler 315.

As described above, the client terminal 102 can make the printers 103a and 103b print a document under a print instruction from the user by using the application 303 installed in the terminal server 101.

[Description of Printer Driver]

Figure 4:
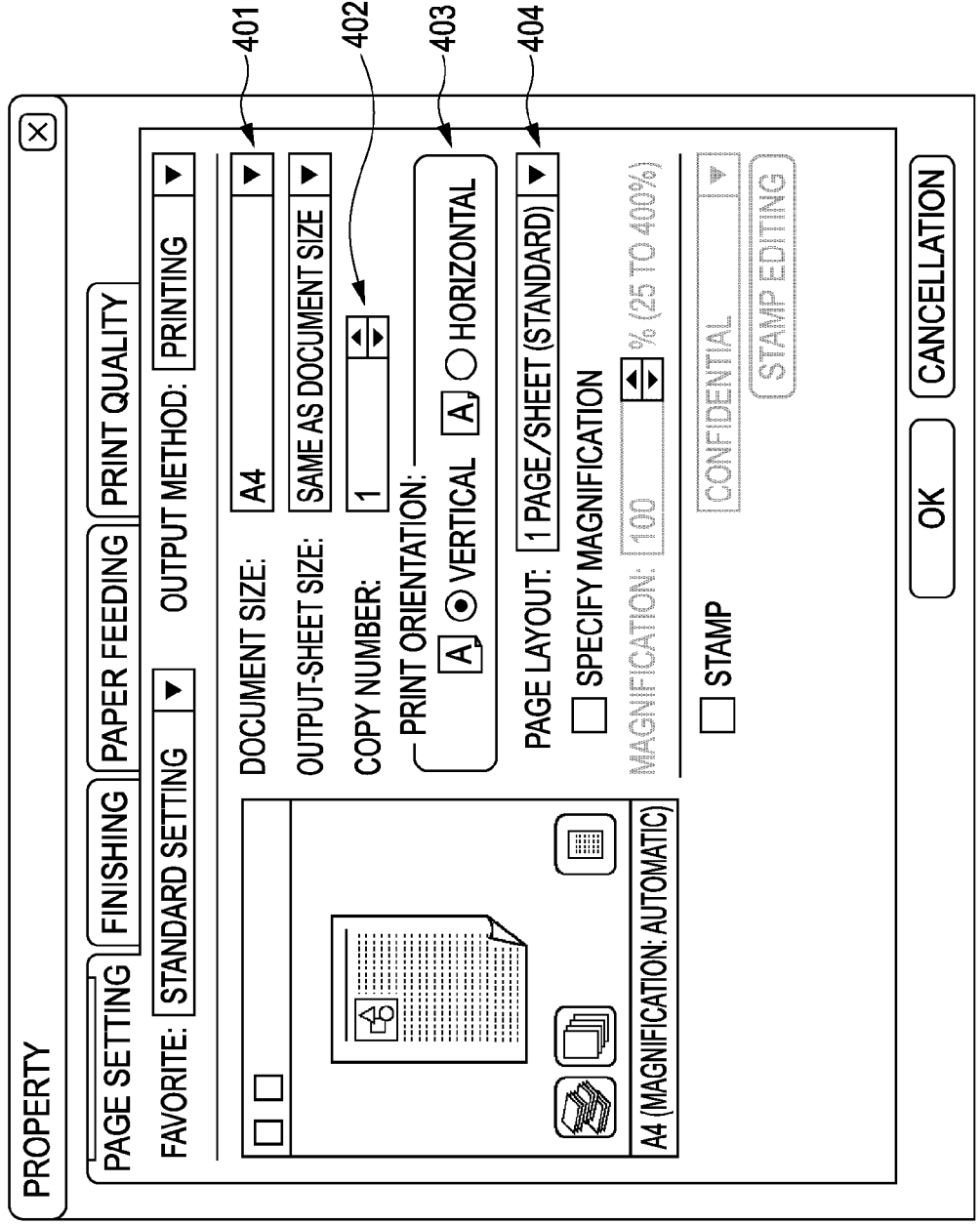
FIG. 4 shows an example print-attribute-setting dialogue of a printer driver according to the first embodiment, where the dialogue is displayed when a page-setting tab is pressed.
Figure 5:
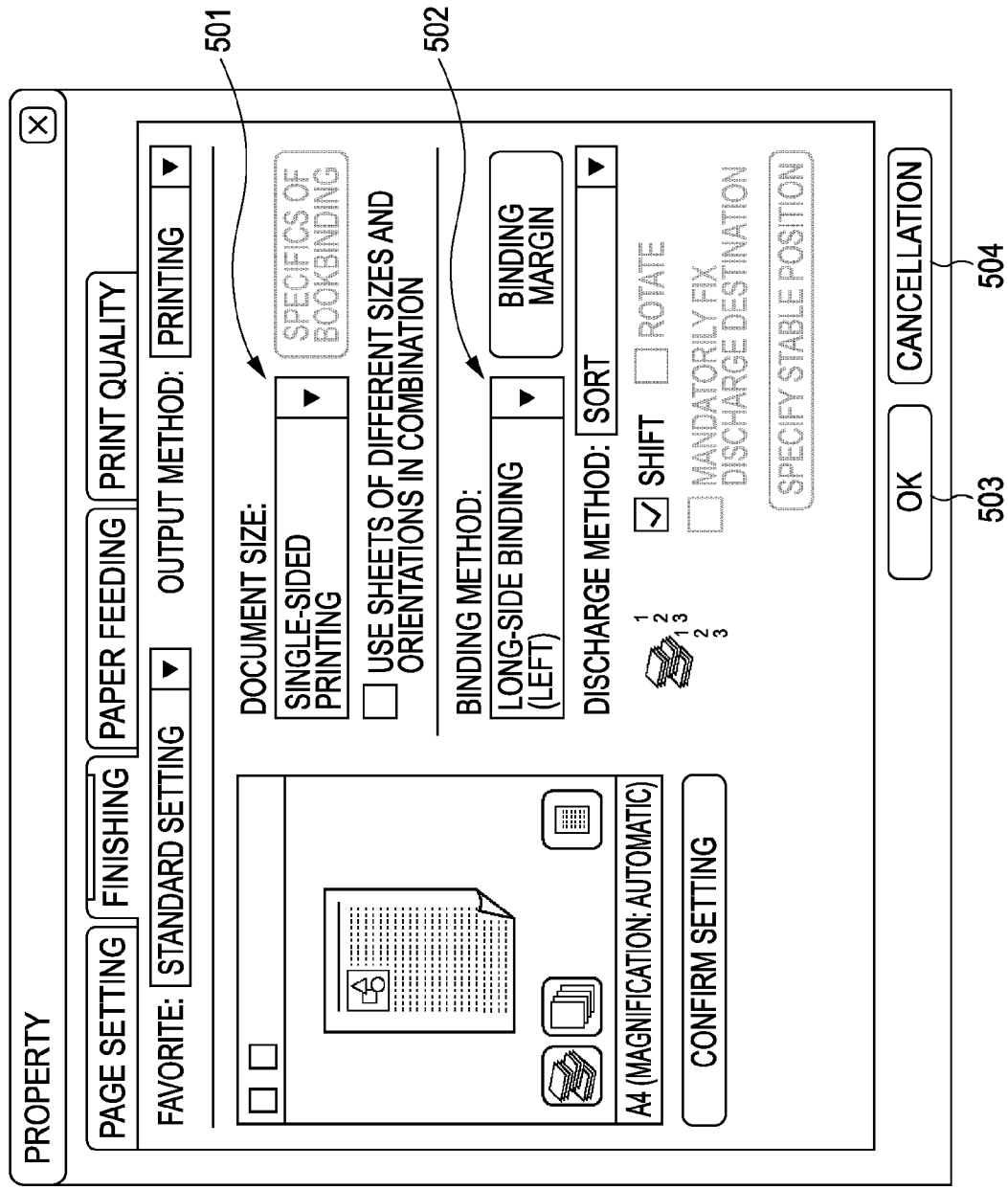
FIG. 5 shows another example print-attribute-setting dialogue of the printer driver according to the first embodiment, where the dialogue is displayed when a finishing tab is pressed.

Next, the printer drivers will be described. FIG. 4 shows an example print-attribute-setting dialogue of the printer driver, the dialogue being displayed when a page-setting tab is pressed. FIG. 5 shows an example print-attribute-setting dialogue of the printer driver, the dialogue being displayed when a finish tab is pressed.

The user can specify parameters for setting a desired print attribute (print-output-process-condition data) by operating keys shown on a graphic user interface (GUI) having a display-screen-image configuration appropriate to instruct the printer 103 to perform output operations including print operations, etc. When the user operates the keys, so as to instruct to display properties relating to "printer" on a print-setting GUI shown on a display when a print instruction is issued through, for example, the operation-screen image of the application 303, the above-described GUI is shown on the display.

Each of the printer drivers 317 and 318 performs control so that data on the print-attribute-setting parameters specified by the user and desired print data are transmitted to the printer 103 via the communication medium.

A sheet-size-setting unit 401, a copy-number-setting unit 402, a sheet-orientation-setting unit 403, an imposition-layout-setting unit 404, etc. are displayed on a screen image shown in FIG. 4. The sheet-size-setting unit 401 is provided so that the user can set the size of a sheet on which data on a print job for printing is recorded. The copy-number-setting unit 402 is provided so that the user can set the number of copies of a print job for processing.

The sheet-orientation-setting unit 403 is provided to make the user select the print orientation of a job for printing from among at least two selection candidates including portrait orientation, landscape orientation, etc. The imposition-layout-setting unit 404 is provided to make the user instruct to select layout mode so that the document-image-data items corresponding to at least two pages are arranged and formed on the same face of a single sheet of record paper. Further, the imposition-layout-setting unit 404 lets the user make a selection from at least two candidates, so as to determine to what number of pages the document-image-data items should correspond, the document-image-data items being arranged and formed on the same face of the single sheet of the record paper in the above-described layout mode. The user can make the desired print settings in individual setting-item parts displayed on the screen image shown in FIG. 4.

A setting part is shown on the screen image shown in FIG. 5, so as to make the user set setting information unique to the printer 103 of the above-described print system. The user makes, for example, a sheet-processing setting including finishing settings including a staple-processing setting, a sort-processing setting, a punch-processing setting, a hole-bore-processing setting, a bookbinding-processing setting, etc., a setting presented to determine which of single-sided printing and duplex printing the user wishes to perform, etc.

Further, at least two setting parts are provided on the screen image shown in FIG. 5, so as to let the user make various types of detailed settings including "settings of more particular adjustments relating to image processing" provided to change "parameters of hues or the like determined by the printer 103".

The user can make the above-described various types of detailed settings by operating the screen image shown in FIG. 5. For example, the printer 103 is controlled so that a print job for printing is printed in the duplex-print mode set by using a setting part 501 provided on the operation-screen image shown in FIG. 5. Further, the printer 103 is controlled so that the duplex-print processing is performed on the basis of "long-side-binding setting in duplex-print mode" set by using a setting part 502.

Further, when an OK key 503 is pressed (specified) on the screen image shown in FIG. 5, the above-described settings made by the user become valid. On the other hand, if a cancel key 504 is pressed (specified), the above-described settings made by the user become invalid. Although not shown in FIG. 5, the user can specify a paperfeed stage, etc. by pressing a tab which reads "paperfeed". Further, the user can make a resolution setting, a halftone setting, etc. by pressing a tab which reads "print quality".

Thus, the user can set the print attribute by using the user interface of the printer driver.

[Method of Restricting Functions of Print System Shown in FIG. 1]

When the user performs business operations, etc. by using the print system including the terminal server 101 and the client terminal 102, the manager of the print system may wish to impose a restriction on printing. For example, since outputting images in color is expensive, the manager may wish to restrict the print function so that images are output in monochrome. Further, the manager may wish to restrict the print function so that 2-up printing (the function of reducing a document of two pages so that data shown on the reduced document is printed on a single sheet) is performed, so as to reduce the cost of printing by reducing the number of output sheets.

When restricting the print function of the print system shown in FIG. 1 in the above-described manner, the following method is usually adopted. Namely, the manager of the print system makes a setting, so as to restrict the print function through the printer driver installed in the terminal server 101. The above-described setting can be made only by a user having the manager's authority. If the user uses the printer within his jurisdiction, the user can only perform printing on the basis of the above-described restriction.

The above-described print system has the advantage of being capable of allowing the manager of the print system to restrict the print function by making a setting of the restriction on the print function only once through the printer driver of the terminal server 101.

[Problems of Method of Restricting Functions of Print System Shown in FIG. 2]

When the user wishes to restrict the print function in the print system shown in FIG. 2, a problem arises when the user makes the print-function-restriction setting. More specifically, since the printer driver actually used for performing the printing is installed in the client terminal 102, it is difficult to restrict functions relating to the printing solely by operating the terminal server 101. According to an example method, the manager of the print system may perform operations at the individual client terminals 102, so as to restrict the functions of the printer drivers installed in the individual client terminals 102. However, if the number of the client terminals 102 becomes large (e.g., several hundred), performing the above-described operations by the manager of the print system is unrealistic.

Therefore, the above-described embodiment presents a method (unit) of allowing the manager of the print system to easily restrict the functions relating to the printing in the print system shown in FIG. 2, for example.

[Flow of Ordinary Printing Performed by Print System Shown in FIG. 2]

Before describing the method of restricting the print function, the operations of the "print system shown in FIG. 2", the operations being performed to execute ordinary printing, will be described. In the following description, the term "print system" denotes the print system shown in FIG. 2.

Figure 6:
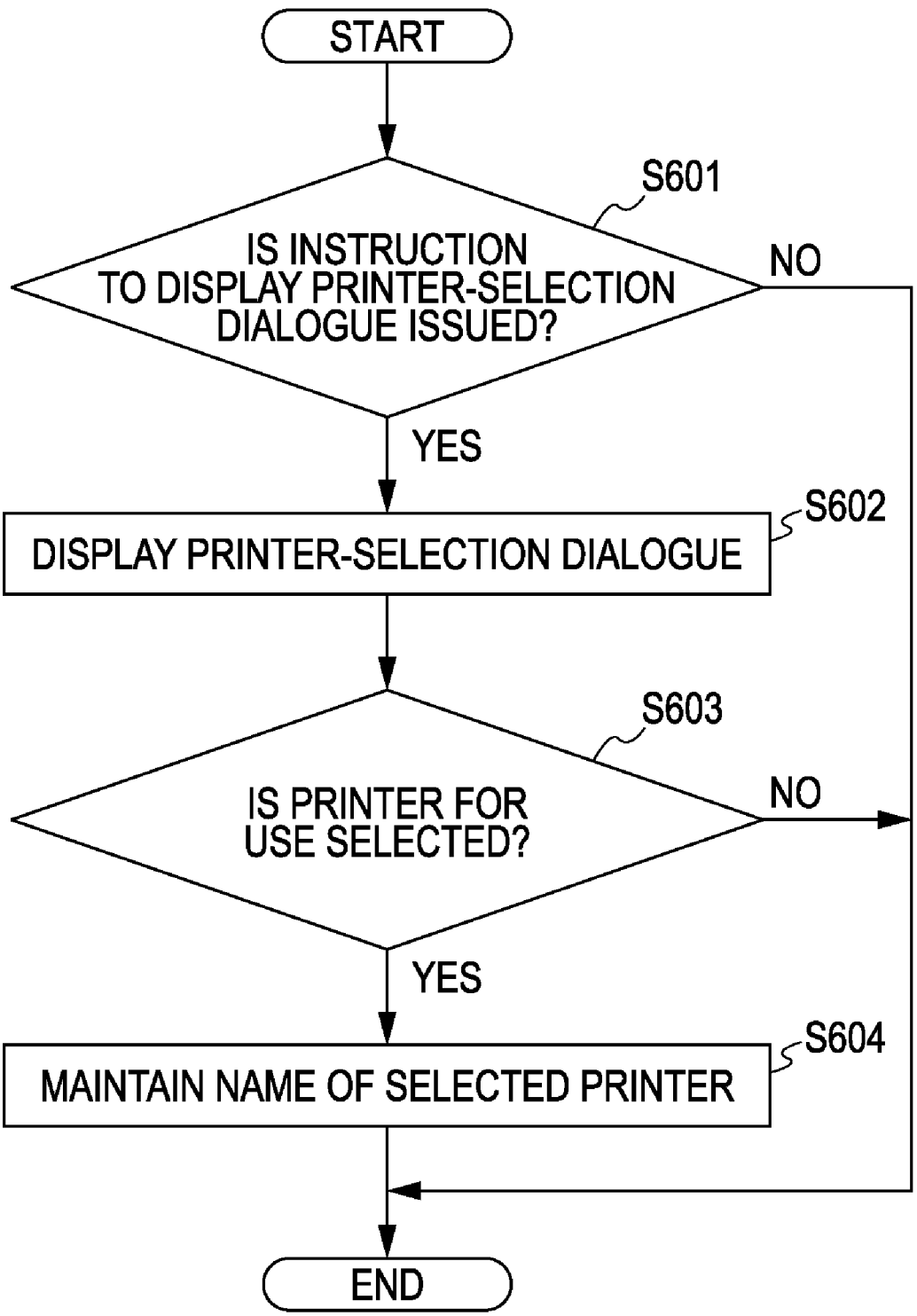
FIG. 6 is a flowchart illustrating example operations performed by a print-control module, so as to select a printer for use according to the first embodiment.

First, the client terminal 102 connects with the terminal server 101 on the basis of an operation performed by the user. Then, the printer 103 for use is selected by the print-control module 310 of the client terminal 102. FIG. 6 is a flowchart showing example operations of the print-control module 310, the operations being performed to select the printer for use.

First, the print-control module 310 determines whether or not an instruction to display a printer-selection dialogue is accepted on the basis of an operation performed by the user, at step S601. If the result of the determination shows that the instruction to display the print-selection dialogue is not accepted, the processing procedures shown in the flowchart of FIG. 6 are terminated.

On the other hand, if the instruction to display the printer-selection dialogue is accepted, the processing advances to step S602, so that the print-control module 310 displays the printer-selection dialogue on the display of the client terminal 102.

Figure 7:
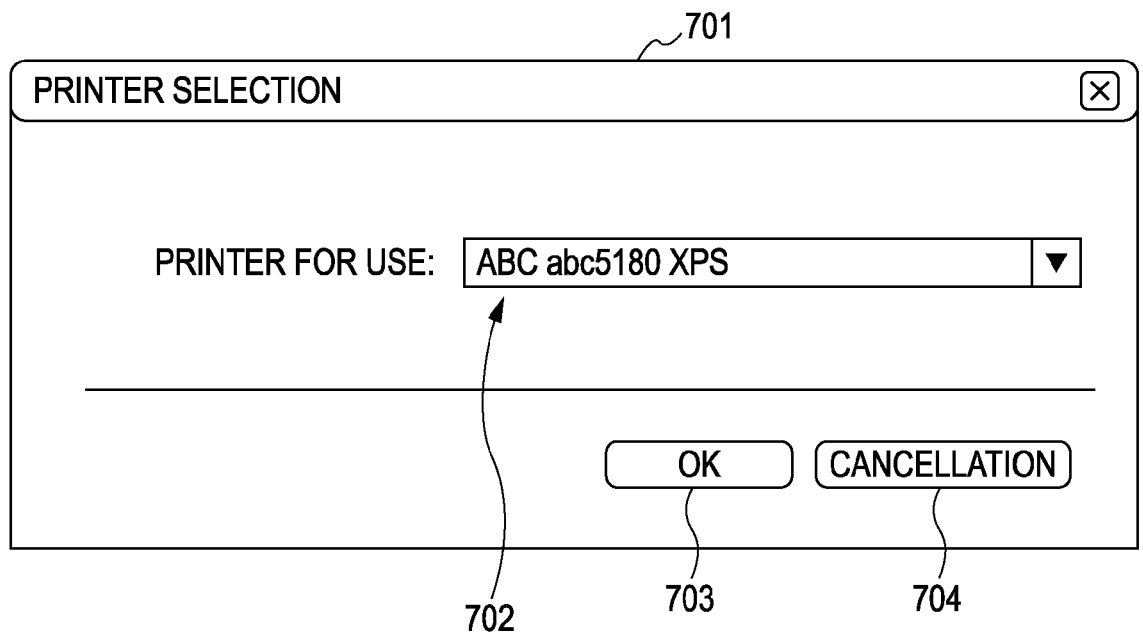
FIG. 7 shows an example printer-selection dialogue according to the first embodiment.

FIG. 7 shows an example of the printer-selection dialogue. In FIG. 7, a control box 702, an OK button 703, and a cancellation button 704 are shown on a printer-selection dialogue 701. The control box 702 shows the list of selectable printers. The OK button 703 is pressed, so as to enable a printer selected in the control box 702 and close the dialogue. The cancellation button 704 is pressed, so as to disable the printer selected in the control box 702 and close the dialogue.

Returning to FIG. 6, the print-control module 310 determines whether or not the printer for use is selected on the basis of an operation performed by the user for the printer-selection dialogue 701, at step S603. If the cancellation button 704 is pressed and the printer for use is not selected, as the result of the determination, the processing procedures shown in the flowchart of FIG. 6 are terminated. On the other hand, if the OK button 703 is pressed and the printer for use is selected, the processing advances to step S604 at which the print-control module 310 maintains data on the name of the printer selected by the user. Then, the processing procedures shown in the flowchart of FIG. 6 are terminated.

Figure 8:
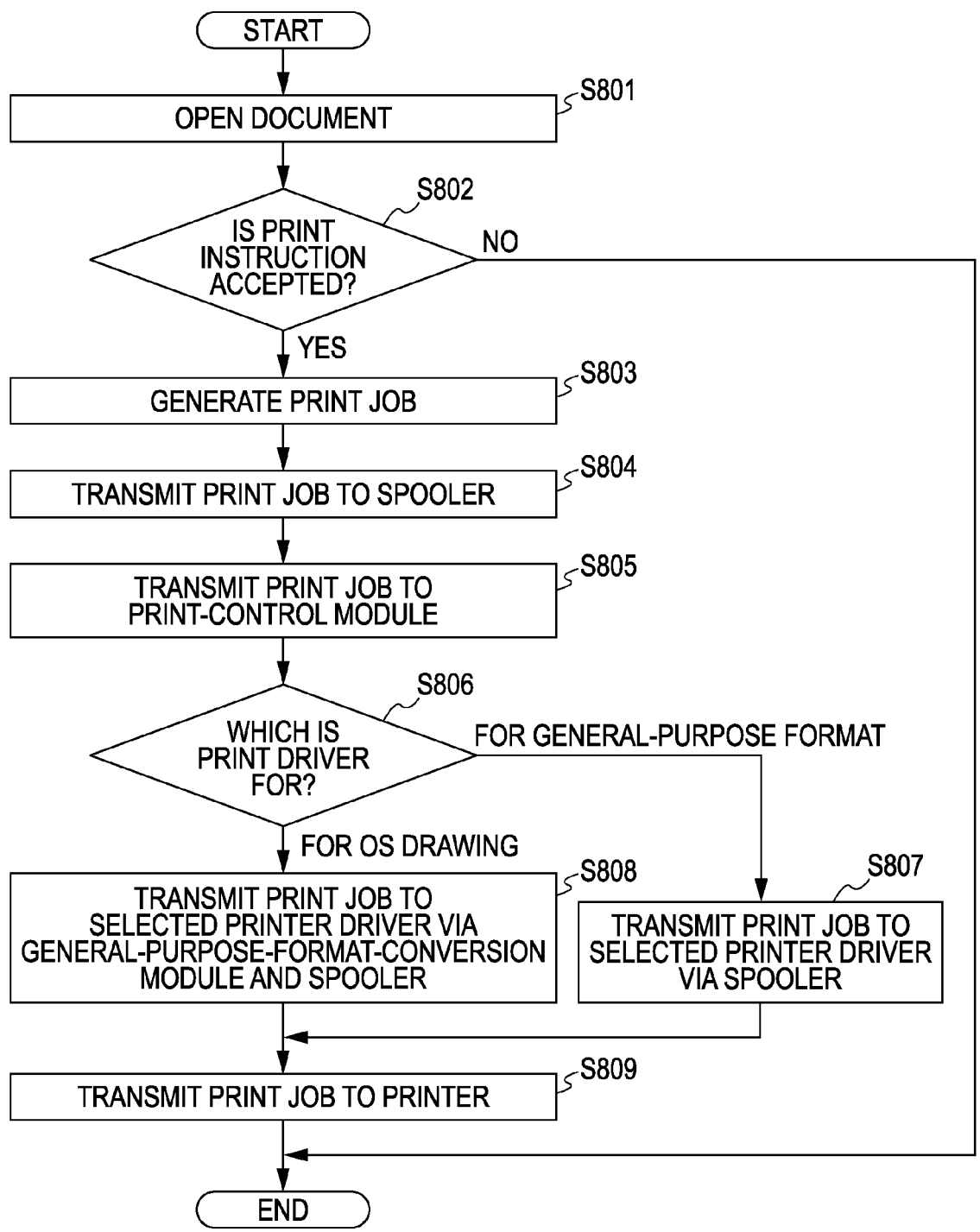
FIG. 8 is a flowchart illustrating example operations performed in the print system according to the first embodiment, where the operations correspond from when a user issues a print instruction to when printing is actually performed by the printer.

After making the settings on the printer used for printing by following the above-described steps, the user issues an actual print instruction. FIG. 8 is a flowchart showing example operations performed in the print system, where the operations correspond from when the user issues the print instruction to when the printing is actually performed by the printer 103.

First, the print-control module 310 connects the client terminal 102 to the terminal server 101 on the basis of an operation performed by the user, at step S801. Then, the print-control module 310 instructs the application 303 stored in the terminal server 101 to open document data. The application 303 opens the document data on the basis of the instruction.

Next, at step S802, the application 303 shows the menu-screen image of the application 303 on the display of the client terminal 102 and determines whether or not the user selects printing on the menu-screen image so that an instruction to perform printing is issued. If the determination result shows that the print instruction is not issued, the processing procedures shown in the flowchart of FIG. 8 are terminated.

On the other hand, if the print instruction is issued, the processing advances to step S803 at which the terminal-server-printer driver 308 receives data on a print job, the print-job data transmitted from the application 303 and/or the general-purpose-format-conversion module 306. As described above, there are two types of the applications 303 including the application provided to generate the general-purpose-format print data 304 and the application provided to generate the OS-drawing print data 305. When the generalpurpose-format print data 304 is generated, the application 303 transmits print-job data including the general-purpose-format print data 304 to the terminal-server-printer driver 308.

On the other hand, when the OS-drawing print data 305 is generated, the application 303 transmits the OS-drawing print data 305 to the general-purpose-format-conversion module 306. The general-purpose-format-conversion module 306 converts the OS-drawing print data 305 into the general-purpose-format print data 307, and transmits print-job data including the general-purpose-format print data 307 to the terminal-server-printer driver 308.

Next, at step S804, the terminal-server-printer driver 308 transmits the transmitted print-job data to the spooler 309. Next, at step S805, the spooler 309 transmits the print-job data to the print-control module 310 stored in the client terminal 102 via the communication medium 104.

The above-described steps are processing procedures performed by the terminal server 101 and processing procedures described hereinafter are performed by the client terminal 102.

Next, at step S806, the print-control module 310 stored in the client terminal 102 determines the type of a "printer functioning as output destination" which is set by the user in accordance with the flowchart of FIG. 6. More specifically, the print-control module 310 determines whether the printer in consideration is the printer driver 318 processing the general-purpose-format-print data or the printer driver 317 processing the OS-drawing-print data on the basis of the acquired print-job data. If the determination result shows that the printer driver in consideration is the printer driver 318, the processing advances to step S807.

At step S807, the print-control module 310 transmits the print-job data to the selected printer driver 318 via the spooler 316. Then, the processing advances to step S809 that will be described later.

On the other hand, if the printer driver in consideration is determined to be the printer driver 317 processing the OS-drawing-print data, at step S806, the processing advances to step S808. In that case, it is difficult for the printer driver 317 functioning as the output destination to process the general-purpose-format-print data 307 included in the print-job data. Therefore, the print-control module 310 transmits the print-job data to the OS-drawing-conversion module 313. Then, the OS-drawing-conversion module 313 converts the general-purpose-format-print data included in the print-job data into the OS-drawing-print data, and transmits the print-job data including the OS-drawing-print data to the printer driver 317 via the spooler 315. Then, the processing advances to step S809.

At step S809, the printer driver 317 and/or the printer driver 318 receives the print-job data transmitted from the spooler 315 and/or the spooler 316, converts the print-job data into print data that can be interpreted by the printer 103a and/or the printer 103b, and transmits the print data to the printer 103a and/or the printer 103b. Then, the printer 103a and/or the printer 103b prints and outputs the print-job data for which the print instruction is issued by the user.

[Summary of Function Restriction]

Figure 9:
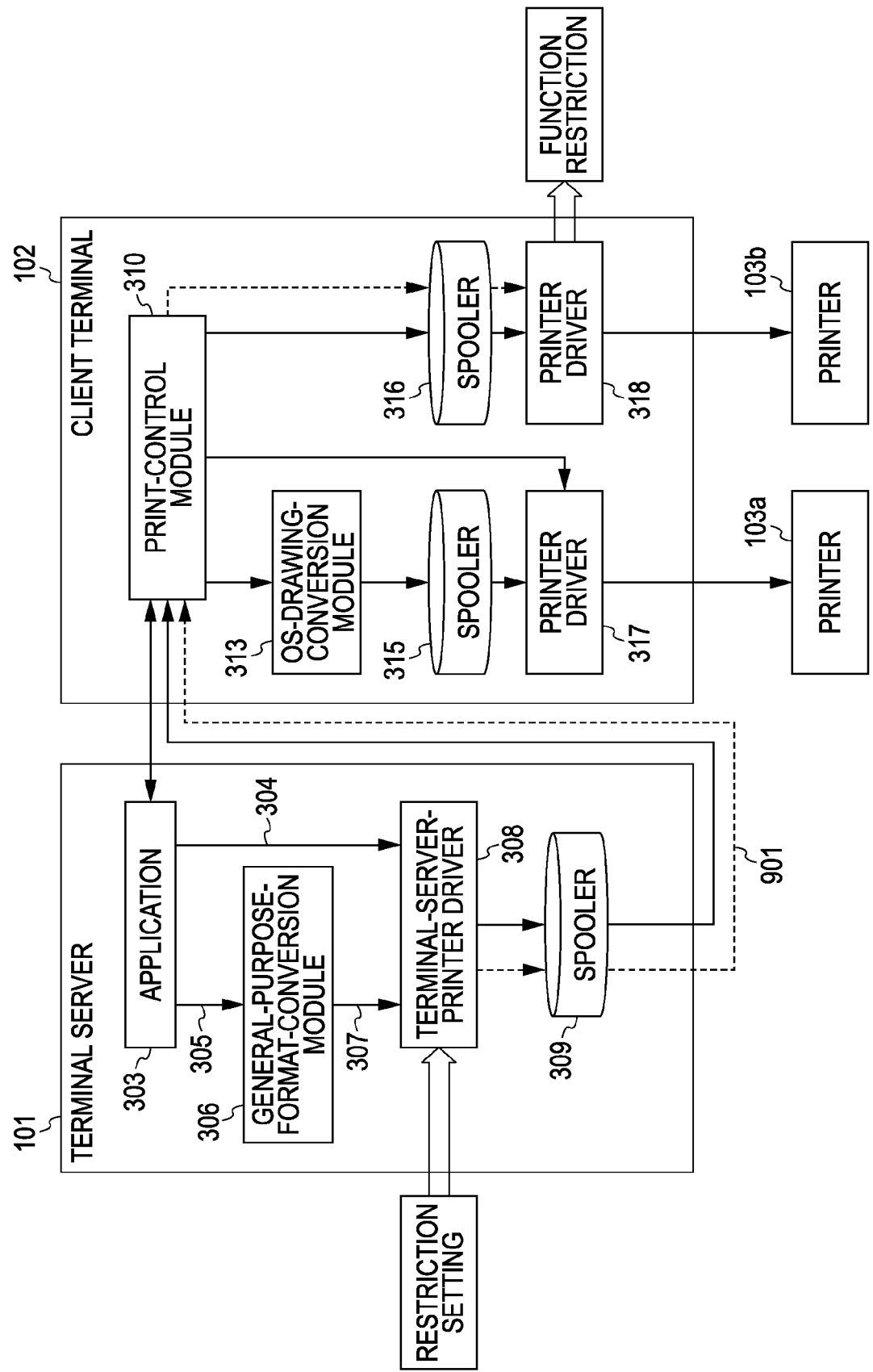
FIG. 9 is a diagram showing an example flow of function-restriction information relating to restricting the print functions according to the first embodiment.

Next, the summary of a method of restricting the print function will be described. FIG. 9 is a diagram showing an example flow of function-restriction information relating to the print-function restriction. When the manager of the print system wishes to restrict print functions of the printer 103 used by the user, the following steps are performed.

First, the system manager specifies at least one of the print functions, as a print function on which the system manager wishes to impose a restriction, and transmits data on the specified print function to the terminal-server-printer driver 308. Next, when the user issues an instruction to perform printing in the print system, the terminal-server-printer driver 308 adds function-restriction information 901 relating to the print-function restriction to the print-job data generated by the application 303. Both the function-restriction information 901 and the print-job data are transmitted to the print-control module 310. Then, both the function-restriction information 901 and the print-job data are transmitted to the printer driver 317 and/or the printer driver 318.

The printer driver 317 and/or the printer driver 318 performs the print-function restriction by overwriting data on "settings on printer driver" made by the user on the basis of the function-restriction information 901, as required, and makes the printer 103a and/or the printer 103b execute the printing. Here, in FIG. 9, the flow of the function-restriction information 901 is shown by broken arrows independently of the flow of the print-job data for the sake of descriptions. As described above, the function-restriction information 901 is added to (included in) the print-job data.

More specifically, the function-restriction information 901 is written as a job ticket, for example, and data on the job ticket is added to the print-job data. The print-job data including the general-purpose-format data is flexibly designed so that the additional job-ticket data can be added to the print-job data. The details on the job-ticket data will be described later.

Further, in FIG. 9, the function-restriction information 901 is transmitted to the printer driver 318 for the sake of descriptions. However, the function-restriction information 901 may be transmitted to the printer driver 317 in accordance with the print job as a matter of course.

Incidentally, it is difficult to add the function-restriction information 901, which is the additional information written as the job ticket or the like, to the OS-drawing-print data. Therefore, if the printer driver selected as the output destination is the printer driver 317 compatible with the OS-drawing-print data, the following problem arises. Namely, when the OS-drawing-conversion module 313 converts the general-purpose-format-print data 307 including the function-restriction information 901 into the OS-drawing-print data, the function-restriction information 901 is deleted.

[Method of Setting Function Restriction]

Next, an example method of restricting the print function and a method of solving the above-described problems will be described in detail. First, the manager of the print system restricts the functions relating to printing through the terminal-server-printer driver 308. Here, the following restrictions are imposed on the print functions irrespective of settings made by the user of the client terminal 102.

First, the above-described method is performed on the precondition that the department management is performed. According to the department management, a department ID (and/or an ID belonging to a person) is given to data on the print job of the user. Further, the department management is performed to manage what type of printing the department (and/or the person) performs and how many sheets the department (and/or the person) uses for the printing. Further, the above-described method is performed on the precondition that pages are laid out so that a 2-up page layout is created without fail. The term "2-up page layout" denotes the function of reducing data shown on a document of two pages into the data corresponding to a single sheet, laying out the data on the single sheet, and outputting the data, whereby the number of output sheets is reduced.

Further, the above-described method is performed on the precondition that the duplex printing is performed. The duplex printing is the function of printing data shown on a document on both faces of an output sheet, which can reduce the number of output sheets.

Figure 10:
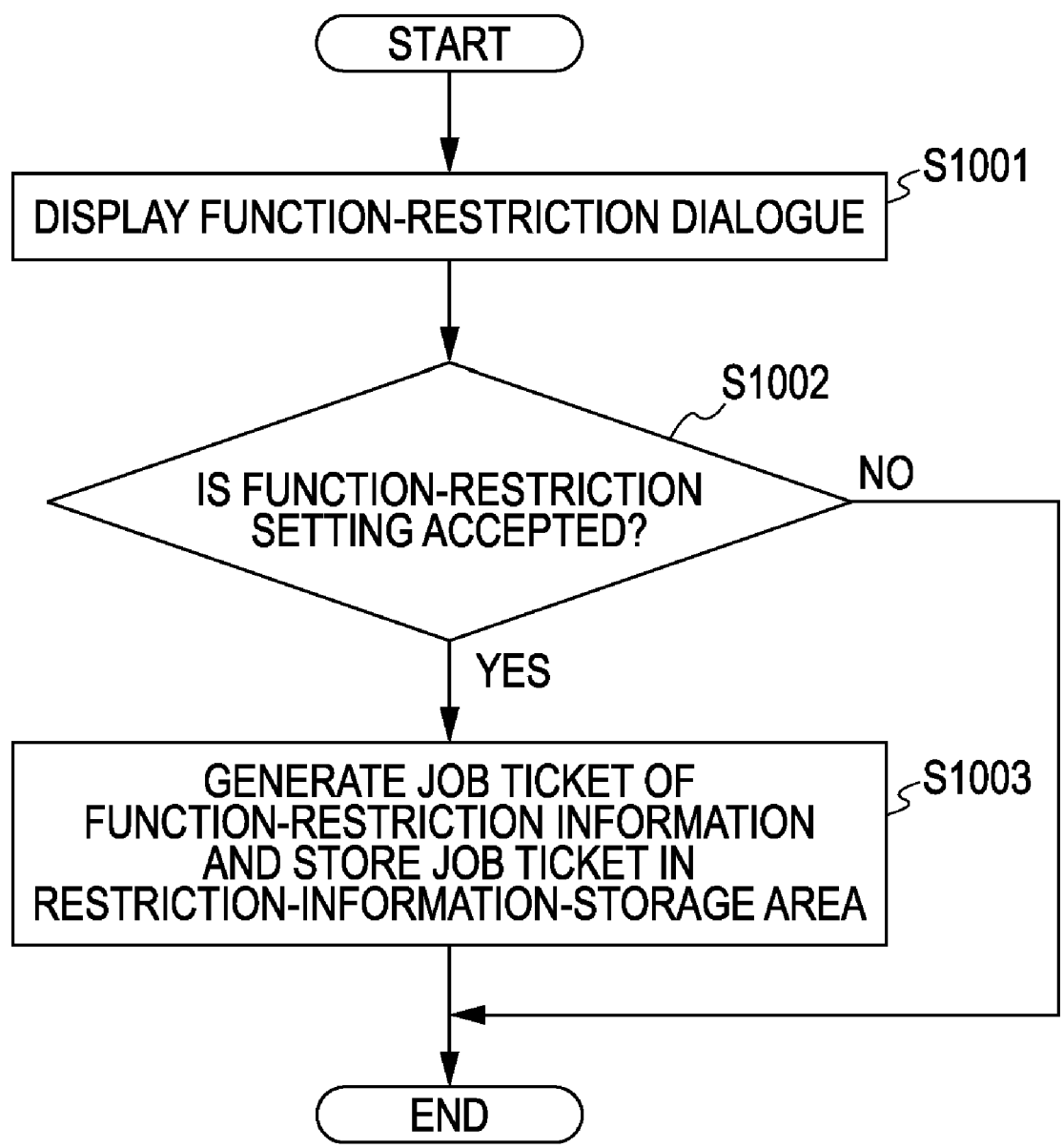
FIG. 10 is a flowchart illustrating example operations performed by a terminal-server-printer driver, so as to make settings of the print-function restriction according to the first embodiment.

FIG. 10 is a flowchart showing example operations performed by the terminal-server-printer driver 308, so as to make the setting of the print-function restriction.

Figure 11:
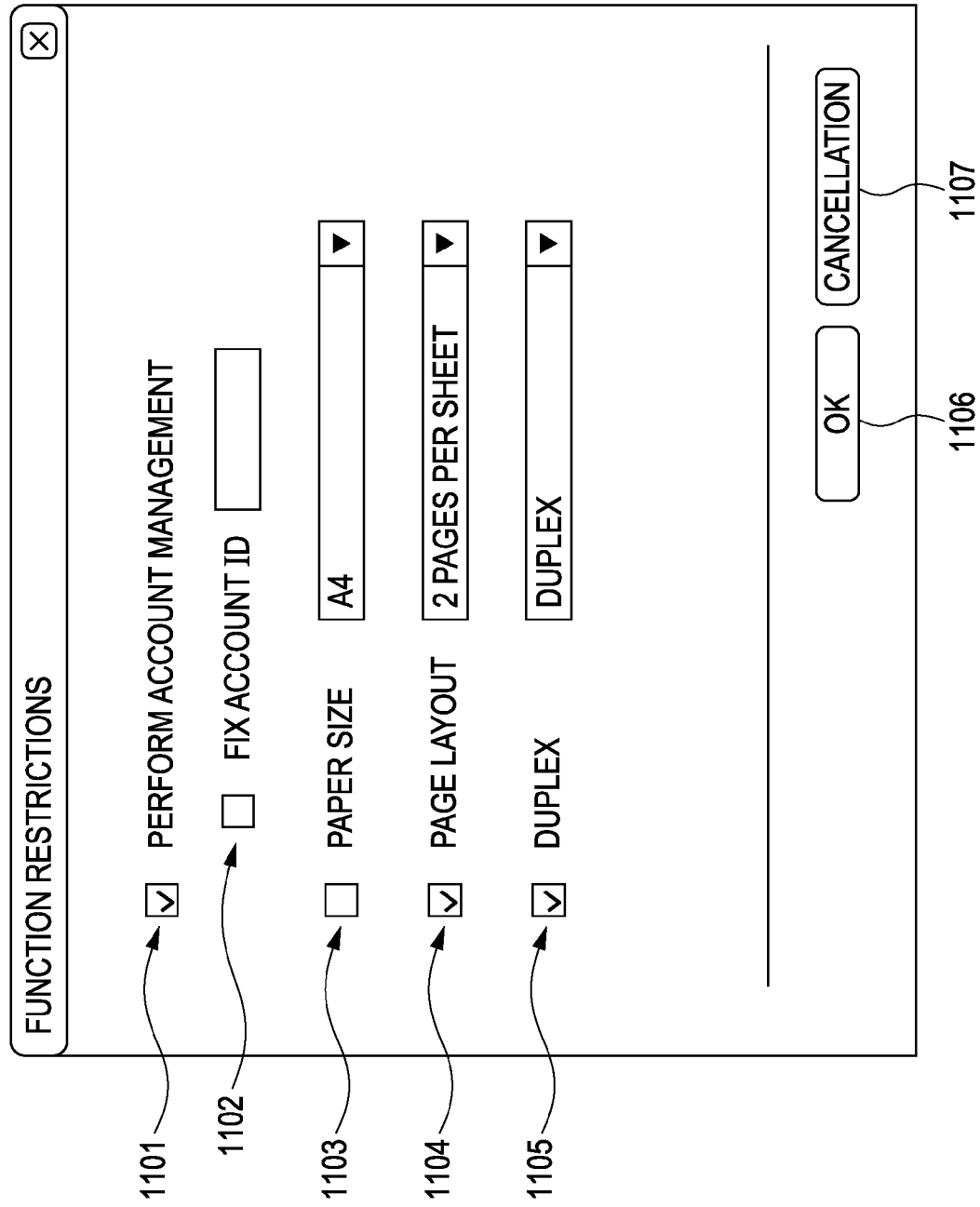
FIG. 11 is a diagram showing an example function-restriction dialogue according to the first embodiment.

First, at step S1001, the terminal-server-printer driver 308 produces the image of the function-restriction dialogue on the display of the terminal server 101 on the basis of an operation performed by the manager of the print system. FIG. 11 shows an example of the function-restriction dialogue. Next, at step S1002, the terminal-server-printer driver 308 determines whether or not data on the print-function setting is accepted on the basis of an operation performed by the manager of the print system for the function-restriction dialogue.

Here, the function-restriction dialogue will be described with reference to FIG. 11. In FIG. 11, a check box 1101 is provided to determine whether or not the above-described department management should be performed. If the check box 1101 is checked (ON), settings are made so that the department management is performed without fail irrespective of the settings on the printer driver of the client terminal 102. For example, if the upper number restrict for print sheets is set for each department, it becomes difficult for a department that had reached the upper number restrict to perform printing.

In that case, a user with evil intent may make settings so that the department management is not performed through the printer driver of the client terminal 102, and perform printing. For eliminating the above-described loophole, the manager of the print system may make settings so that the department management is performed without fail. Further, the check box 1102 is checked, so as to fix the department ID when performing the department management. In FIG. 11, the department management is performed without fail and the department IDs are input for the individual users of the client terminals 102. Therefore, the check box 1102 is not checked (OFF).

The check box 1103 is checked, so as to restrict the sheet size. When the check box 1103 is checked and the sheet size is selected from a control box provided on the right of the check box 1103, printing is performed only for a sheet of the selected sheet size. Further, in this drawing, the user may select the sheet size without restraint. Therefore, the check box 1103 is not checked (OFF).

A check box 1104 is checked, so as to set the above-described page layout. In this drawing, since the functions are restricted so that data is output by using the 2-up page layout at all times, the check box 1104 is checked. Then, "2 pages per sheet" is selected from among alternatives shown in a control box shown on the right of the check box 1104.

A check box 1105 is checked, so as to restrict the function to the duplex printing. In this drawing, since printing is performed for both the sides of a sheet at all times, a check box 1105 is checked. Then, "Duplex" is selected from among alternatives shown in a control box shown on the right of the check box 1105.

Further, an OK button 1106 is pressed, so as to validate the content of the settings made through the function-restriction dialogue and close the function-restriction dialogue. On the other hand, a cancellation button 1107 is pressed, so as to cancel the content of the settings made through the function-restriction dialogue and close the function-restriction dialogue. Here, the manager of the print system clicks on (presses) the OK button 1106, so as to validate the content of the settings and close the function-restriction dialogue.

Returning to FIG. 10, if the cancellation button 1107 is pressed on the image of the function-restriction dialogue so that the print-function settings are not accepted, the processing procedures shown in the flowchart of FIG. 10 are terminated. On the other hand, if the OK button 1106 is pressed so that the print-function settings are accepted, the processing advances to step S1003.

At step S1003, the terminal-server-printer driver 308 performs the next processing. Namely, the terminal-server-printer driver 308 generates job-ticket data including data on the content of the function-restriction information 901 set by the manager of the print system on the basis of the content of data accepted at step S1002, and stores the job-ticket data in a restriction-information-storage area which is generated in, for example, a random-access memory (RAM) and/or a hard-disk drive (HDD) provided in the terminal server 101.

FIG. 12 shows an example of the job ticket including data on the content of the function-restriction information 901. The job ticket may be generated in any format without being limited to that shown FIG. 12 so long as the format is appropriate to make the user identify the content of the function-restriction information 901. According to the example shown in FIG. 12, the format of the job-ticket data is written in an extensible markup language (XML).

In FIG. 12, a line 1201 indicates a tag showing that the function restriction is written, where the tag is paired with a tag indicated by a line 1211. Lines 1202, 1203, and 1204 indicate that restrictions are imposed on the functions relating to the department management. Since the value of the line 1203 is "true", the department management is performed at all times, as the function restriction.

Lines 1205, 1206, and 1207 indicate that restrictions are imposed on the functions relating to the page layout. Since the value of the line 1206 is "2-up", printing is performed by using the 2-up page layout at all times, as the function restriction. Lines 1208, 1209, and 1210 indicate that restrictions are imposed on the functions so that the duplex printing is performed. Since the value of the line 1209 is "duplex", printing is performed by using the both sides of a sheet at all times, as the function restriction.

Figure 13:
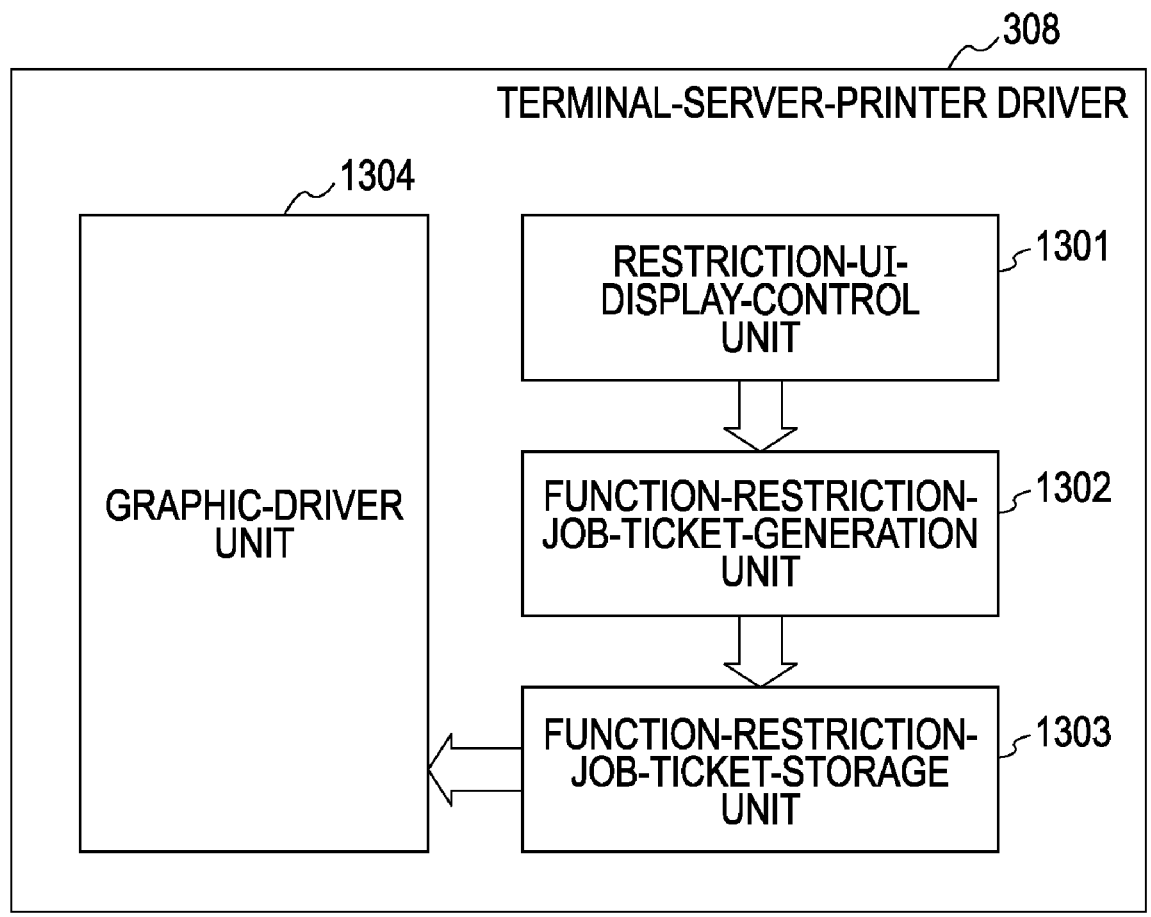
FIG. 13 is a diagram showing an example functional configuration of the terminal-server-printer driver according to the first embodiment.

FIG. 13 shows an example function configuration of the terminal-server-printer driver 308. FIG. 13 indicates that the terminal-server-printer driver 308 is roughly divided into a graphic-driver part 1304 provided to perform printing and drawing, and UI parts 1301, 1302, and 1303 that are provided to impose restrictions on the functions.

The UI parts 1301 to 1303 perform the processing procedures corresponding to the individual steps described in the flowchart of FIG. 10. At step S1001, the terminal-server-printer driver 308 displays the function-restriction dialogue (UI), where the display is performed by the UI part 1301, which is a restriction-UI-display-control unit. Further, at step S1003, the terminal-server-printer driver 308 generates the job-ticket data including data on the content of the function-restriction information 901, where the generation processing is performed by the UI part 1302, which is a function-restriction-job-ticket-generation unit.

Further, at step S1003, the terminal-server-printer driver 308 stores the generated job-ticket data, where the storage processing is performed by the UI part 1303, which is a function-restriction-job-ticket-storage unit.

[Flow of Function Restriction]

Figure 14:
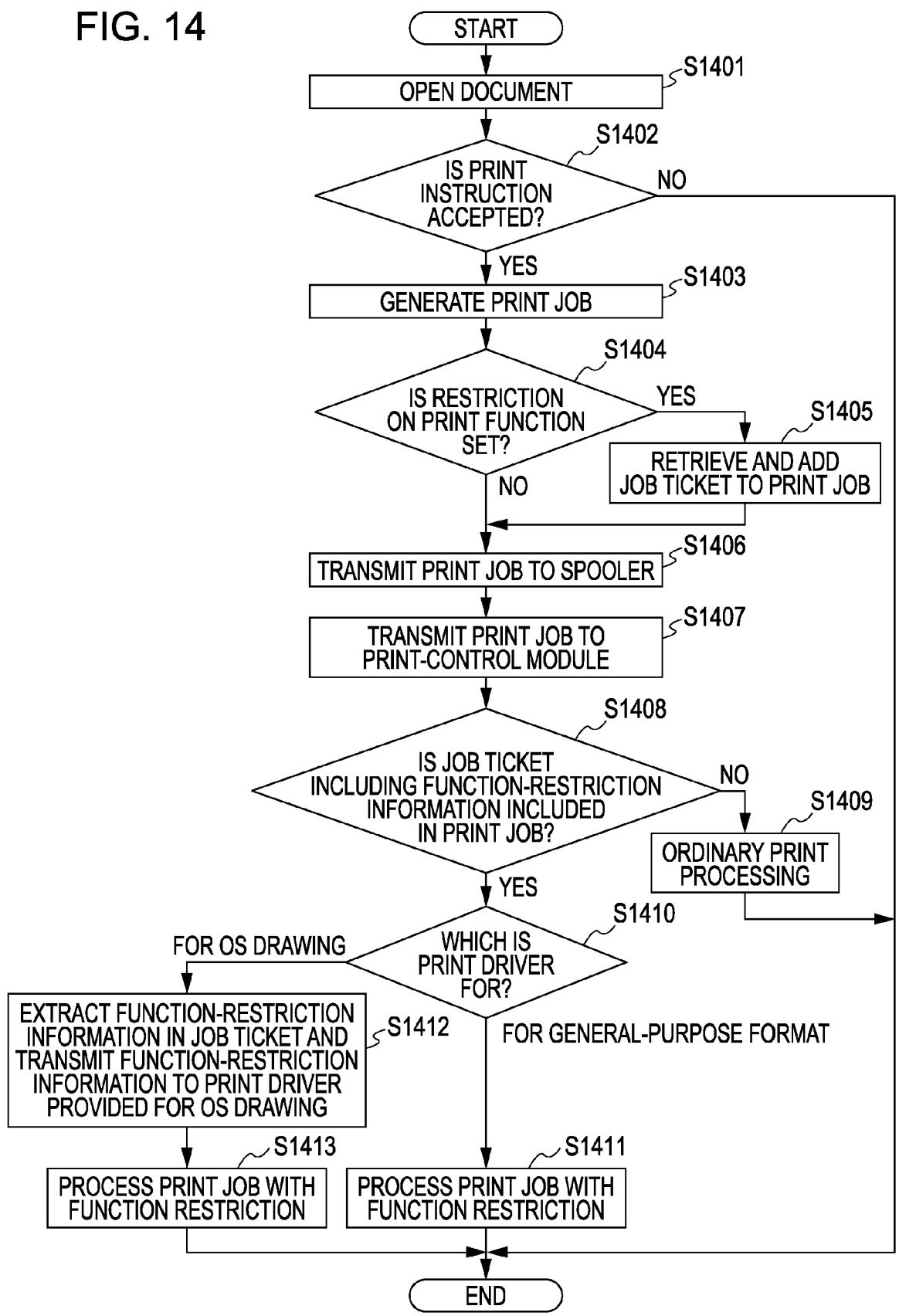
FIG. 14 is a flowchart illustrating example operations performed in the print system according to the first embodiment, the operations correspond from when the user issues a print instruction to when the function restriction is imposed and printing is actually performed.
Figure 15:
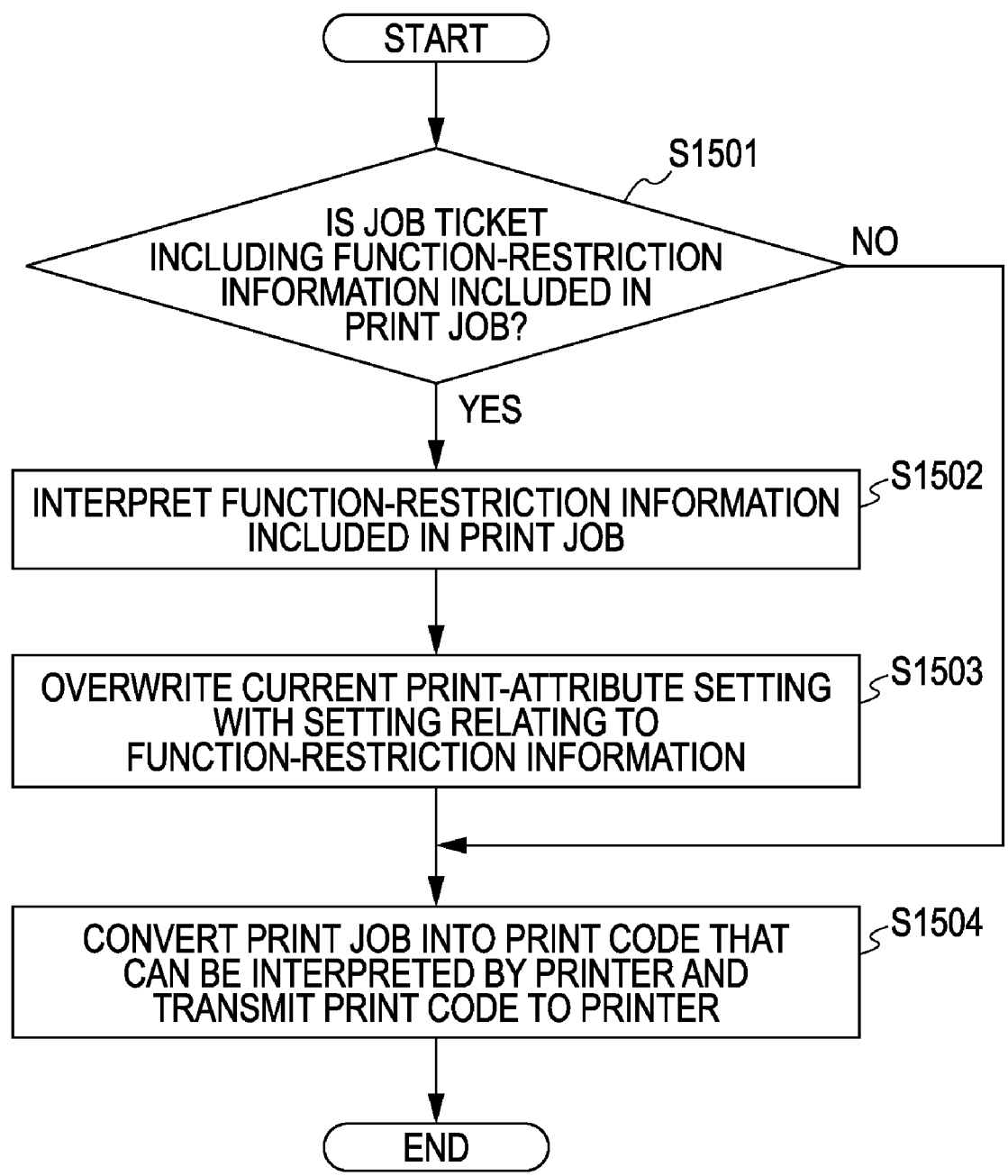
FIG. 15 is a flowchart illustrating first example operations performed by a client terminal, so as to perform function-restriction processing according to the first embodiment.
Figure 19:
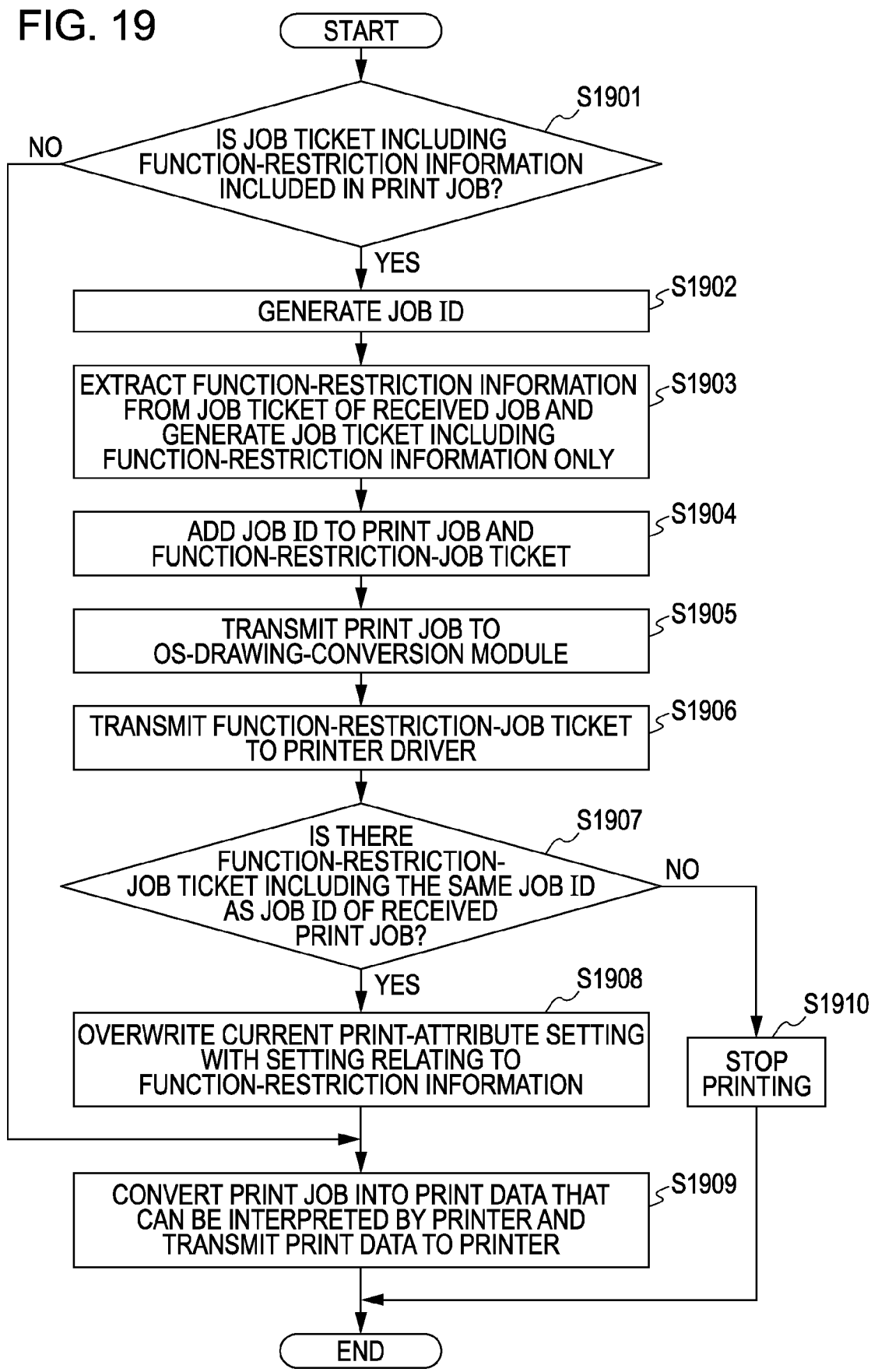
FIG. 19 is a flowchart illustrating second example operations performed by the client terminal, so as to perform the function-restriction processing according to the first embodiment.

Next, example processing procedures performed to execute printing will be described. FIG. 14 is a flowchart illustrating example operations performed by the print system, the operations corresponding to from when the user issues the print instruction to when restrictions are imposed on the functions and printing is actually performed. Here, as described above, the client terminal 102 includes the two types of printer drivers including the printer drivers 317 and 318. In FIG. 14, the processing procedures performed by the individual printer drivers 317 and 318 are expressed as a single step and/or a two steps, so as to describe the processing procedures more specifically. Details on the above-described processing procedures will be described with reference to individual FIGS. 15 and 19. Namely, details on step S1412 are shown in FIG. 15, and those on steps S1413 and S1411 are shown in FIG. 19.

In FIG. 14, steps S1401, S1402, S1403, S1404, S1405, S1406, and S1407 are processing procedures performed by the terminal server 101. Further, steps S1408, S1409, S1410, S1411, S1412, and S1413 are processing procedures performed by the client terminal 102.

First, the processing procedures corresponding to steps S1401 to S1407 performed by the terminal server 101 will be described with reference to the flowchart shown in FIG. 14. At step S1401, the print-control module 310 connects the client terminal 102 to the terminal server 101 in a communicable manner on the basis of an operation of the user. Then, the print-control module 310 instructs the application 303 stored in the terminal server 101 to open document data.

Next, at step S1402, the application 303 shows the menu-screen image of the application 303 on the display of the client terminal 102 and determines whether or not the user selects printing on the menu-screen image so that an instruction to perform printing is issued. If the determination result shows that the print instruction is not issued, the processing procedures shown in the flowchart of FIG. 14 are terminated.

On the other hand, if the print instruction is issued, the processing advances to step S1403 so that the terminal-server-printer driver 308 receives data on a print job, the print-job data transmitted from the application 303 and/or the general-purpose-format-conversion module 306. As described above, there are two types of the applications 303 including the application provided to generate the general-purpose-format print data 304 and the application provided to generate the OS-drawing print data 305. When the general-purpose-format print data 304 is generated, the application 303 transmits print-job data including the general-purpose-format print data 304 to the terminal-server-printer driver 308.

On the other hand, when the OS-drawing print data 305 is generated, the application 303 transmits the OS-drawing print data 305 to the general-purpose-format-conversion module 306. The general-purpose-format-conversion module 306 converts the OS-drawing print data 305 into the general-purpose-format print data 307, and transmits print-job data including the general-purpose-format print data 307 to the terminal-server-printer driver 308.

Next, at step S1404, the terminal-server-printer driver 308 determines whether or not restrictions are currently imposed on the print functions. As shown in FIG. 13, the terminal-server-printer driver 308 owns the function-restriction-job-ticket-storage unit 1303. Therefore, the terminal-server-printer driver 308 determines whether or not the restrictions are imposed on the print functions by determining whether or not the job-ticket data including data on the content of the function-restriction information 901 exists in the function-restriction-job-ticket-storage unit 1303.

If the determination result shows that the restrictions are imposed on the print functions, the processing advances to step S1405. On the other hand, if no restrictions are imposed on the print functions, the processing skips step S1405 and advances to step S1406 that will be described later.

When the processing advances to step S1405, the terminal-server-printer driver 308 retrieves and adds the job-ticket data shown in FIG. 12 to the print-job data. Originally, data on a job attribute such as an XML is written in each of the print-job data including the general-purpose-format-print data 304 and the print-job data including the general-purpose-format-print data 307. Therefore, the terminal-server-printer driver 308 adds the job-ticket data to each print-job data at the part where the job attribute is written in.

At step S1406, the terminal-server-printer driver 308 transmits the print-job data to the spooler 309. Next, at step S1407, the spooler 309 transmits the print-job data to the print-control module 310 stored in the client terminal 102 via the communication medium 104.

The above-described processing procedures are performed by the terminal server 101, the processing procedures corresponding to from when the print instruction is issued to when the print job is transmitted.

Next, the processing procedures corresponding to steps S1408, S1409, S1410, S1411, S1412, and S1413 that are performed by the client terminal 102 will be described with reference to the flowchart shown in FIG. 14. First, at step S1408, the print-control module 310 stored in the client terminal 102 determines whether or not the job-ticket data including data on the content of the function-restriction information 901 is added to the print-job data. The above-described determination can be made by determining whether or not a tag which reads "<Feature name="FunctionRestrictions">" exists in the job-ticket data added to the print-job data, for example.

If the determination result shows that the job-ticket data including the data on the content of the function-restriction information 901 is not added to the print-job data, the processing advances to step S1409 and ordinary print processing is performed. The ordinary print processing is achieved by performing the processing procedures corresponding to steps S806, S807, and S809 that are shown in FIG. 8, for example. Then, the processing procedures shown in the flowchart of FIG. 14 are terminated.

On the other hand, if the job-ticket data including the data on the content of the function-restriction information 901 is added to the print-job data, the processing advances to step S1410. At step S1410, the print-control module 310 determines the type of the "printer functioning as output destination" which is set by the user in accordance with the flowchart of FIG. 6. The above-described determination can be made, as is the case with step S806 shown in FIG. 8. If the determination result shows that the target print driver is the printer driver 318 processing the general-purpose-format-print data, the processing advances to step S1411.

At step S1411, the print-control module 310 transmits the print-job data to which the job-ticket data including the data on the content of the function-restriction information 901 is added to the printer driver 318 via the spooler 316. The printer driver 318 processes the print-job data with the function restrictions. Details on the processing procedure corresponding to step S1411 will be described later with reference to FIG. 15.

On the other hand, if the target printer driver is determined to be the printer driver 317 processing the OS-drawing-print data, at step S1410, the processing advances to step S1412. At step S1412, the print-control module 310 extracts and transmits the function-restriction information 901 included in the job-ticket data to the printer driver 317. Further, the print-control module 310 transmits the print-job data to the OS-drawing-conversion module 313.

Next, at step S1413, the print job with the function restrictions is processed. Details on the processing procedures performed at steps S1412 and S1413 will be described later with reference to FIG. 19.

Thus, in the above-described embodiment, a generation unit is achieved by performing the processing procedures corresponding to steps S1403 and S1405, and a determining unit is achieved by performing the processing procedure corresponding to step S1408. Further, an identification unit is achieved by performing the processing procedure corresponding to step S1410, and a processing unit is achieved by performing the processing procedures corresponding to steps S1411, S1412, and S1413. Still further, a first output unit is achieved by performing the processing procedure corresponding to step S1411 and a second output unit is achieved by performing the processing procedure corresponding to step S1412.

Further, in the above-described embodiment, a server device is achieved by using the terminal server 101, a client-terminal device is achieved by using the client terminal 102, and a second print device is achieved by using the printer 103a, and a first print device is achieved by using the printer 103b. Still further, in the above-described embodiment, a second printer driver is achieved by using the printer driver 317, and a first printer driver is achieved by using the printer driver 318.

Hereinafter, an example where a printer driver functioning as the output destination of the print-job data is the printer driver 318 processing the general-purpose-format-print data and an example where the printer driver functioning as the output destination of the print-job data is the printer driver 317 processing the OS-drawing-print data will be independently described.

[Processing Performed for Restricting Functions of General-Purpose-Format-Print Job]

FIG. 15 is a flowchart illustrating the first example operations performed by the client terminal 102, so as to perform the function-restriction processing. FIG. 15 mainly shows operations performed when the printer driver functioning as the output destination of the print-job data is the printer driver 318 processing the general-purpose-format-print data.

First, at step S1501, the printer driver 318 determines whether or not the job-ticket data including the data on the content of the function-restriction information 901 is added to the print-job data. The determination can be made, as is the case with step S1408 shown in FIG. 14, for example.

If the determination result shows that the above-described job-ticket data is not added to the print-job data, the processing advances to step S1504. At step S1504, the printer driver 318 converts the print-job data including the general-purpose-format-print data 304 into print code that can be interpreted by the printer 103b, and transmits the print code to the printer 103b.

Further, depending on the types, the printer 103 can interpret the general-purpose-format-print data 304 in its original format. Therefore, the printer driver 318 transmits the print-job data to the printer 103b without converting the print-job data into the print code depending on the type of the printer 103b functioning as the output destination.

On the other hand, when the job-ticket data including the data on the content of the function-restriction information 901 is added to the print-job data at step S1501, the processing advances to step S1502 at which the printer driver 318 interprets the function-restriction information 901 added to the print-job data. The function-restriction information 901 included in the print-job data is written in job-ticket data shown in FIG. 12, for example. The printer driver 318 can determine that the restrictions are imposed on the print functions so that the functions "department management is performed", "pages are laid out so that 2-up page layout is created", and "duplex printing" are performed on the basis of the job-ticket data.

Next, at step S1503, the printer driver 318 overwrites the current settings (print-attribute settings) on the printer driver 318 with settings relating to the function-restriction information 901. For example, if the current (default) print settings on the printer driver 318 are determined to be "department management is not performed", "pages are laid out so that 1-up page layout is created", and "single-sided printing", the above-described settings are overwritten with the function-restriction information 901. Namely, the above-described settings are overwritten with "department management is performed", "pages are laid out so that 2-up page layout is created", and "duplex printing" without fail. At that time, the printer driver 318 performs processing procedures on the basis of the overwritten settings.

First, the settings are made so that the "department management is performed". Therefore, even though the user makes the settings so that the department management is not performed for the printer driver 318 stored in the client terminal 102, the printer driver 318 shows a department-management dialogue on the display of the client terminal 102 without fail.

Figure 16:
FIG. 16 is a diagram showing an example department-management dialogue according to the first embodiment.

FIG. 16 shows an example of the department-management dialogue. In FIG. 16, a control box 1602 in which a department ID is input, a control box 1603 in which the password of the department ID is input, an OK button 1604, and a cancellation button 1605 are displayed on a department-management dialogue 1601. The user inputs necessary information in the above-described control boxes 1602 and 1603 by operating the keyboard and/or the mouse of the client terminal 102. When performing printing on the basis of the input information, the user continues the print processing by pressing the OK button 1604. On the other hand, when cancelling the printing, the user cancels the print processing by pressing the cancellation button 1605.

Figure 17:
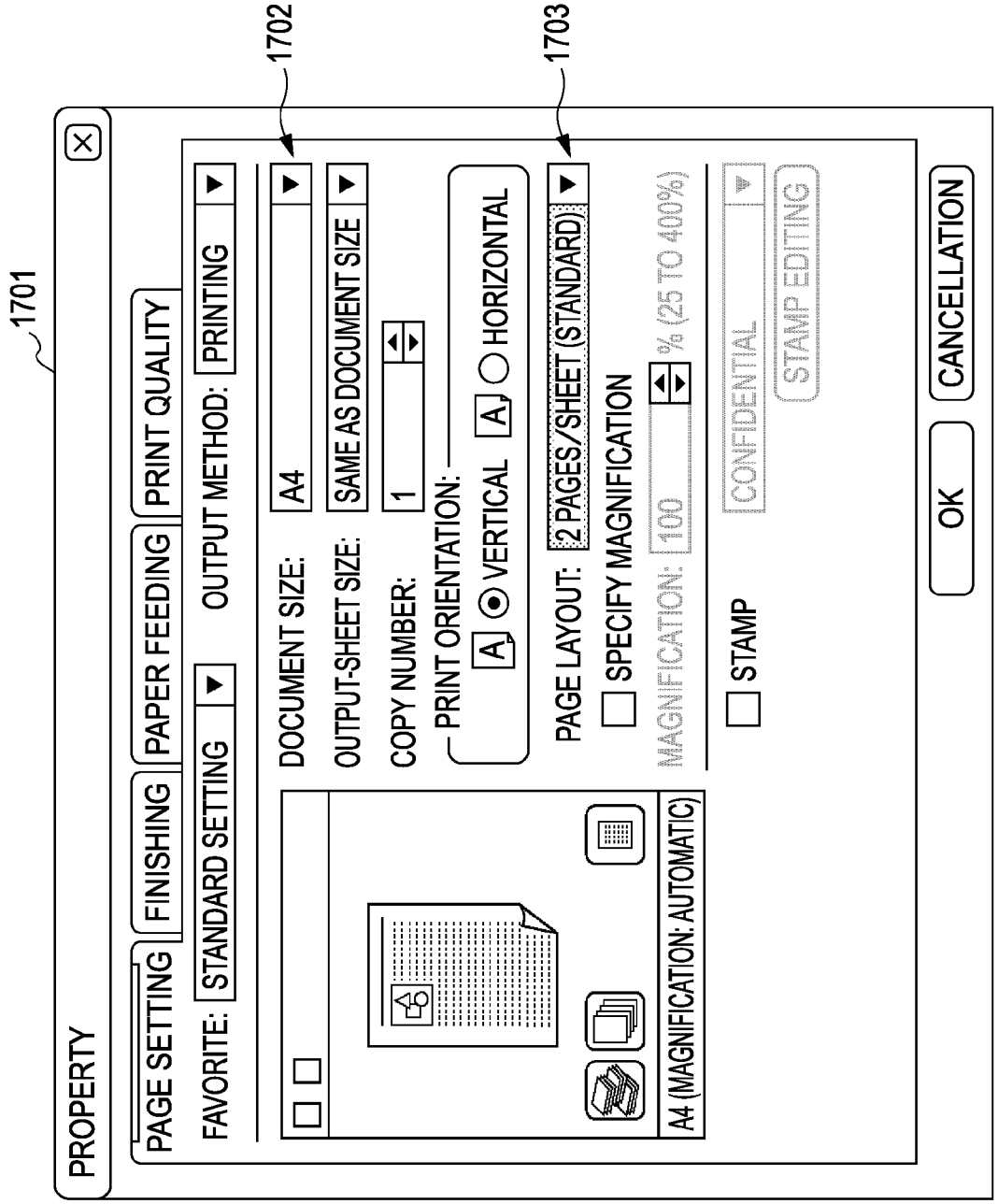
FIG. 17 shows a "print-attribute-setting dialogue of the printer driver" displayed when the print function is restricted, that is, an example "print-attribute-setting dialogue of the printer driver" displayed when a page-setting tab is pressed according to the first embodiment.

FIG. 17 shows a "print-attribute-setting dialogue of the printer driver 318" displayed when restrictions are imposed on the print functions. More specifically, FIG. 17 shows an example "print-attribute-setting dialogue of the printer driver 318" displayed when a page-setting tab is pressed. When restricting the print functions, the manager of the print system does not restrict the sheet size, but restricts the method of laying out pages to the 2-up page layout, as described above.

Therefore, the user can set the sheet size in a sheet-size-setting part 1702 of the print-attribute-setting dialogue 1701 shown in FIG. 17. However, in a layout-setting unit 1703, a control box provided to set the page layout is grayed out, which makes it difficult for the user to set anything other than the 2-up page layout.

Figure 18:
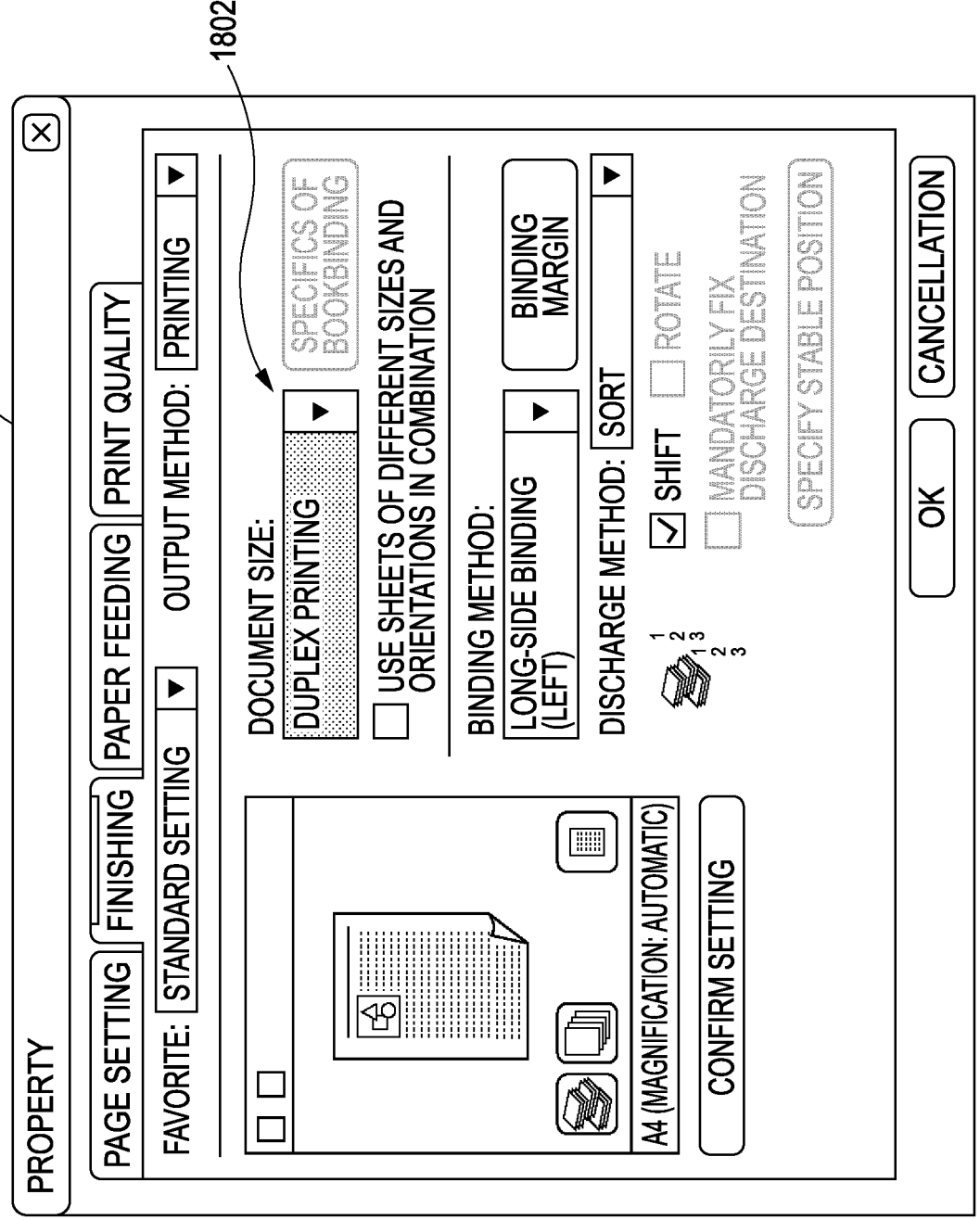
FIG. 18 shows another "print-attribute-setting dialogue of the printer driver" displayed when the print function is restricted, that is, an example "print-attribute-setting dialogue of the printer driver" displayed when a finishing tab is pressed according to the first embodiment.

FIG. 18 shows another "print-attribute-setting dialogue of the printer driver 318" displayed when restrictions are imposed on the print functions. More specifically, FIG. 18 shows an example "print-attribute-setting dialogue of the printer driver 318" displayed when a finishing tab is pressed. In a setting part 1802 of a print-attribute-setting dialogue 1801 shown in FIG. 18, a print-method-control box provided to specify either the single-sided printing or the duplex printing is grayed out, in the state where the duplex printing is selected, which makes it difficult for the user to set anything other than the duplex printing.

As described above, the settings of the print-function restrictions are made through the terminal-server-printer driver 308 so that the print functions can be restricted through the printer driver 318 of the client terminal 102. Thus, in the above-described embodiment, a processing unit included in the first printer driver is achieved by performing the processing procedures corresponding to steps S1502, S1503, and S1504 that are shown in FIG. 15.

[Processing Performed to Restrict Functions of OS-Drawing-Print Job]

Next, example processing procedures performed to restrict the functions of a print job including the OS-drawing-print data will be described in detail, where the example processing procedures are performed at steps S1413 and S1411 that are shown in FIG. 14.

The OS-drawing-print data does not have a format used to describe the job-ticket data shown in FIG. 12, for example. Therefore, the function-restriction information 901 is deleted when the OS-drawing-conversion module 313 converts the general-purpose-format-print data 307 to which the job-ticket data including the function-restriction information 901 is added into the OS-drawing-print data. Therefore, the above-described loss of the function-restriction information 901 should be avoided.

FIG. 19 is a flowchart illustrating the second example operations performed by the client terminal 102, so as to perform the function-restriction processing. FIG. 19 mainly shows operations performed when the printer driver functioning as the output destination of the print-job data is the printer driver 317 processing the OS-drawing-print data.

First, at step S1901, the print-control module 310 determines whether or not the job-ticket data including the data on the content of the function-restriction information 901 is added to the print-job data. The determination can be made, as is the case with step S1408 shown in FIG. 14, for example.

If the determination result shows that the above-described job-ticket data is not added to the print-job data, the processing advances to step S1909. At step S1909, the OS-drawing-conversion module 313 converts the general-purpose-format-print data 307 included in the print-job data into the OS-drawing-print data, and transmits the OS-drawing-print data to the printer driver 317 via the spooler 315. The printer driver 317 converts the print-job data including the OS-drawing-print data into print data that can be interpreted by the printer 103a, and transmits the print data to the printer 103a. The printer 103a renders the print data, and prints and outputs the rendered print data. Then, the processing procedures shown in the flowchart of FIG. 19 are terminated.

On the other hand, if it is determined that the job-ticket data including the data on the content of the function-restriction information 901 is added to the print-job data, at step S1901, the processing advances to step S1902 at which the print-control module 310 generates a job ID. The job ID should be the only job ID used in the above-described print system. For example, a universal unique ID (UUID), sequential numerical values, characters, etc. can be used, as the job ID. The job ID may be provided in any format so long as the uniqueness thereof can be insured.

Next, at step S1903, the print-control module 310 extracts the function-restriction information 901 from the job-ticket data added to the transmitted print-job data, and generates job-ticket data only including the function-restriction information 901. More specifically, the job-ticket data shown in FIG. 12 is generated by performing the above-described procedure, that is, step S1903. In the following description, the job-ticket data only including the function-restriction information 901 is referred to as a function-restriction-job-ticket data, as required.

Next, at step S1904, the print-control module 310 adds data on the job ID generated at step S1903 to each of the print-job data and the function-restriction-job-ticket data. The job ID may be added to the print-job data at the time when the print-job data is submitted to the OS-drawing-conversion module 313. The job-ID data may be added to a print-attribute structure, or added to the print-job data, as comment data. When the job-ID data is added to the function-restriction-job-ticket data, the job-ID data is added to the job-ticket data shown in FIG. 12, for example.

FIG. 20 is an example of the function-restriction-job-ticket data to which the job-ID data is added. In the above-described example, the job-ID data is added to the function-restriction-job-ticket data, as shown in the lines 2012, 2013, 2014, 2015, and 2016. Namely, the job-ID data is added to the function-restriction-job-ticket data, as below.

```
<Feature name = "JobID">
<Property name = "JobIDbyNumber">
<Value>1234abcd</Value>
</Property>
</Feature>
```

However, the job-ID data may be added to the function-restriction-job-ticket data in any style so long as the job ID can be identified later.

Returning to the description shown in FIG. 19, when the processing advances to step S1905, the print-control module 310 transmits the print-job data to which the job-ID data is added to the OS-drawing-conversion module 313. Then, the OS-drawing-conversion module 313 converts the transmitted print-job data into print-job data including the OD-drawing-print data.

Figure 21:
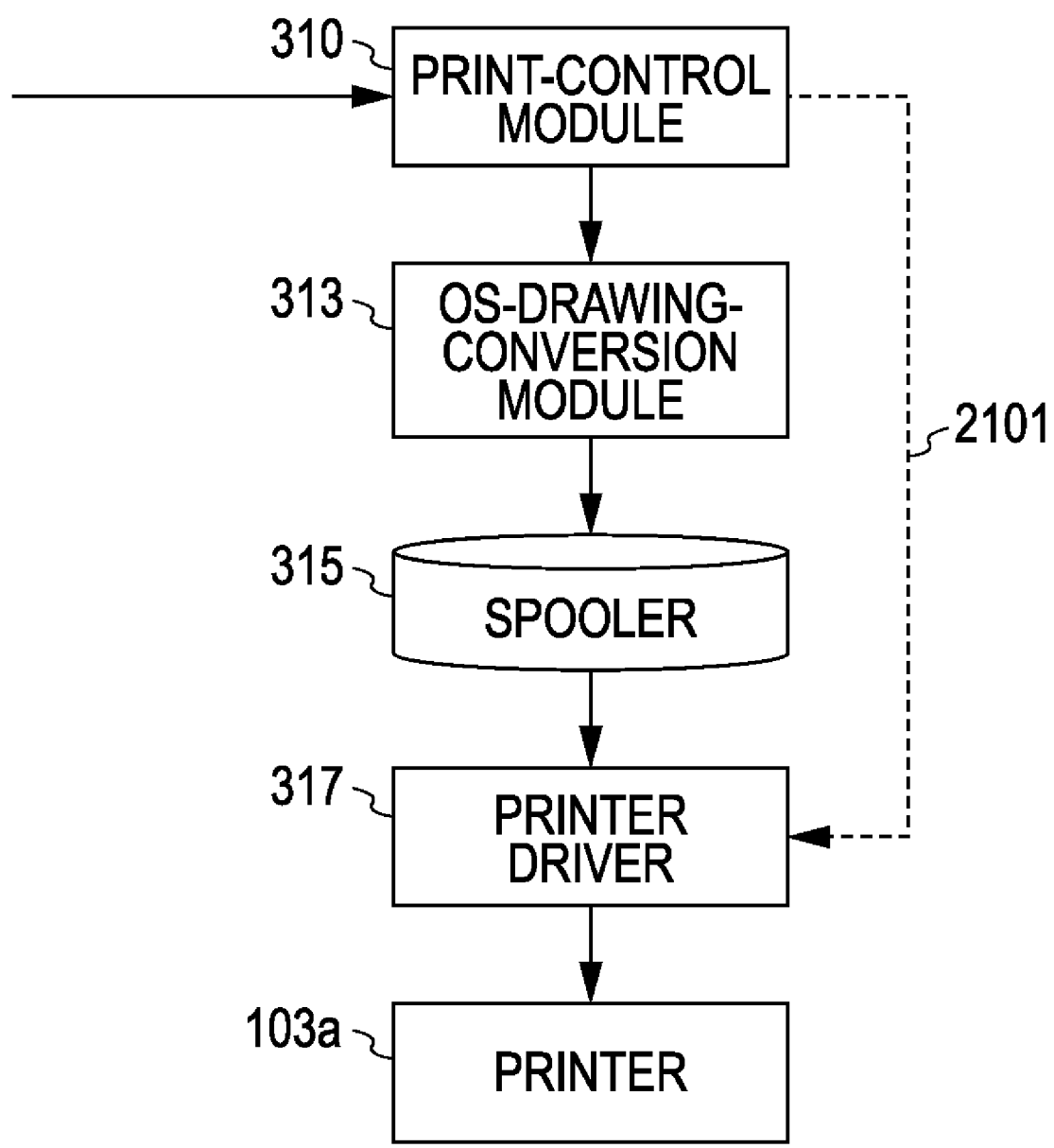
FIG. 21 shows example flows of print-job data and the function-restriction-job-ticket data according to the first embodiment.

FIG. 21 shows example flows of the print-job data and the function-restriction-job-ticket data. In FIG. 21, the print-job data to which the job-ID data is added is transmitted to the printer driver 317 in the direction of the flow indicated by solid lines. On the other hand, function-restriction-job-ticket data 2101 extracted by the print-control module 310 is directly transmitted to the printer driver 317 in the direction of the flow indicated by a broken line.

Figure 22:
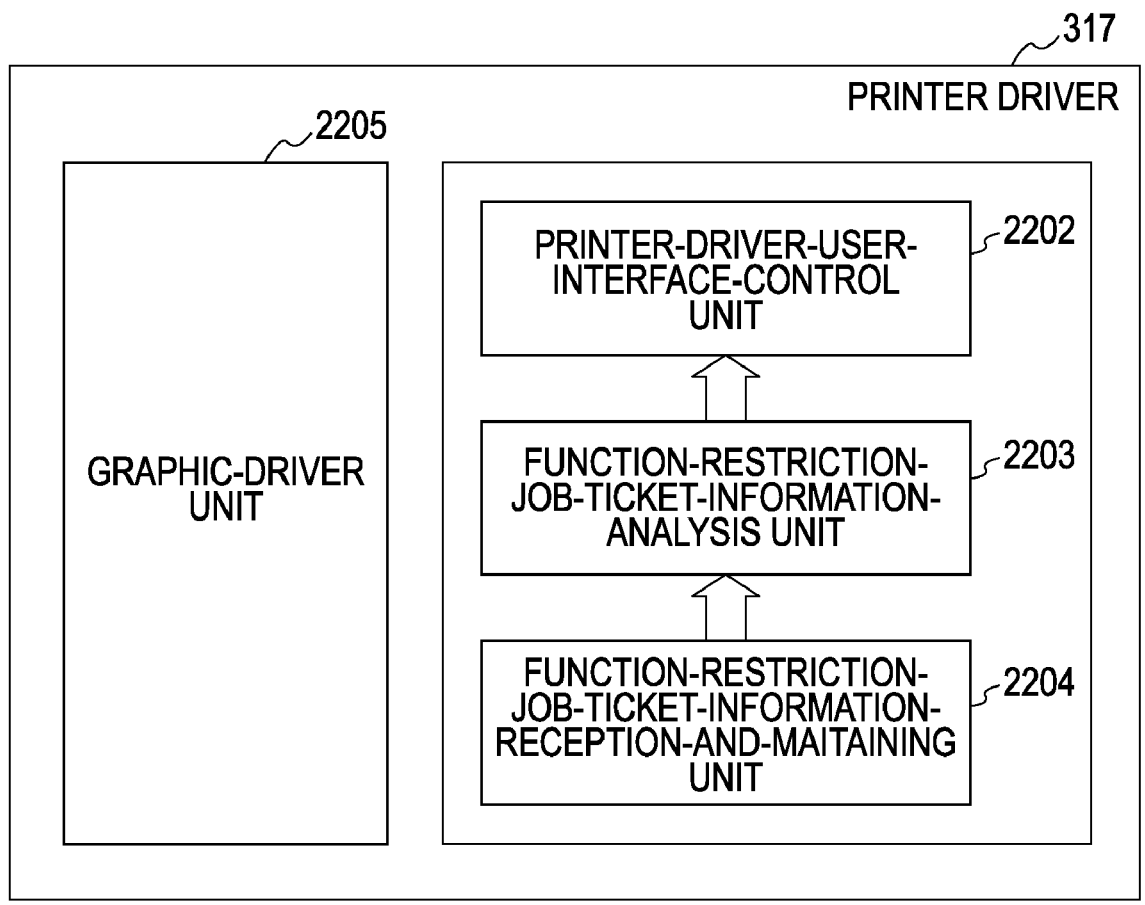
FIG. 22 shows an example functional configuration of a printer driver processing OS-drawing-print data according to the first embodiment.

FIG. 22 shows an example function configuration of the printer driver 317 used to process the OS-drawing-print data. The OS-drawing-printer driver 317 has the function configuration shown in FIG. 22, for example, so as to receive the function-restriction-job-ticket data 2101 transmitted from the print-control module 310. In FIG. 22, a graphic driver 2205 converts the OS-drawing-print data into drawing data that can be interpreted by the printer 103a.

A function-restriction-job-ticket-information-reception-and-maintaining unit 2204 is a module provided to receive and maintain the function-restriction-job-ticket data 2101 transmitted from the print-control module 310. A function-restriction-job-ticket-analysis unit 2203 is a module provided to analyze details on the function-restriction-job-ticket data 2101 when the data 2101 is necessary.

A printer-driver-user-interface-control unit 2202 is a module provided to perform the print-function-restriction processing on the basis of details on the analysis performed by the function-restriction-job-ticket-analysis unit 2203.

Returning to FIG. 19, when the processing advances to step S1907, the printer driver 317 determines whether or not the function-restriction-job-ticket data 2101 including the same job-ID data as that added to the transmitted print-job data is received. If the determination result shows that the above-described function-restriction-job-ticket data 2101 is not received, the processing advances to step S1910. At step S1910, the printer driver 317 determines that a print error occurs and terminates the printing processing. Then, the printer driver 317 terminates the processing procedures shown in the flowchart of FIG. 19. Incidentally, at step S1910, the processing procedures may be terminated after an error message is displayed.

On the other hand, if the function-restriction-job-ticket data 2101 including the same job-ID data as the job-ID data added to the print-job data is received, at step S1907, the processing advances to step S1908. At step S1908, the printer driver 317 overwrites the current settings (print-attribute settings) on the printer driver 318 with settings relating to the function-restriction-job-ticket data 2101 (the function-restriction information 901). Further, the operation performed at step S1907 can be achieved, as is the case with step S1503 shown in FIG. 15.

Further, at step S1909, the printer driver 317 converts the print-job data into print data that can be interpreted by the printer 103a and transmits the print data to the printer 103a. Then, the printer 103a renders the print data, and prints and outputs the print data. Then, the processing procedures shown in the flowchart of FIG. 19 are terminated.

Thus, in the above-described embodiment, the first addition unit and the second addition unit are achieved by performing the processing procedure corresponding to step S1904 shown in FIG. 19, and a conversion unit is achieved by performing the processing procedure corresponding to step S1905. Then, in the above-described embodiment, a processing unit included in the second printer driver is achieved by performing the processing procedures corresponding to steps S1907 to S1910.

Thus, in the above-described embodiment, the terminal-server-printer driver 308 generates and stores job-ticket data including the data on the content of the function-restriction information 901 set by the manager of the print system. If a print instruction is issued after the above-described processing procedures are performed, the terminal-server-printer driver 308 adds the job-ticket data to the print-job data and transmits the print-job data to the print-control module 310.

The print-control module 310 selects either the printer driver 317 or the printer driver 318 performing processing on the basis of the content of the print-job data, and outputs the print-job data and the job-ticket data in accordance with the selected printer driver, that is, either the printer driver 317 or the printer driver 318. The selected printer driver, that is, either the printer driver 317 or the printer driver 318 rewrites data on the print-attribute settings thereon without fail on the basis of the job-ticket data, and transmits drawing data generated on the basis of the rewritten print-attribute-setting data to the printer 103a or the printer 103b.

If the print-job data transmitted to the print-control module 310 should be processed by the printer driver 318 used to process the general-purpose-format-print data, the print-control module 310 transmits the print-job data to the printer driver 318. The printer driver 318 rewrites the data on the print-attribute settings thereon without fail on the basis of the job-ticket data added to the print-job data, and transmits drawing data generated on the basis of the rewritten print-attribute-setting data to the printer 103b.

On the other hand, if the received print-job data should be processed by the printer driver 317 used to process the OS-drawing-print data, the print-control module 310 performs the following processing. Namely, the print-control module 310 extracts the job-ticket data added to the print-job data, and generates the function-restriction-job-ticket data 2101 only including the function-restriction information 901. The print-control module 310 adds the same job-ID data to each of the print-job data and the function-restriction-job-ticket data 2101, and transmits the print-job data to the OS-drawing-conversion module 313 and transmits the function-restriction-job-ticket data 2101 to the printer driver 317.

The printer driver 317 receives the print-job data including the job-ID data and the OS-drawing-print data, the print-job data being transmitted from the OS-drawing-conversion module 313 via the spooler 315. The printer driver 317 rewrites data on the print-attribute settings thereon without fail on the basis of the function-restriction-job-ticket data 2101 having the same job-ID data as that included in the received print-job data, and transmits drawing data generated on the basis of the rewritten print-attribute-setting data to the printer 103a.

By performing the above-described processing procedures, the following advantages can be obtained in the print system in which the printer driver is installed in each of the terminal server 101 and the client terminal 102. Namely, the print functions of the printer drivers 317 and 318 of the client terminal 102 can be restricted only by making the settings of the print-function restriction for the printer driver of the terminal server 101 (the terminal-server-printer driver 308). Therefore, it becomes easier to impose restrictions on the print functions of the print system in which the printer driver is installed in each of the terminal server 101 and the client terminal 102 than in the past.

Second Embodiment

Next, a second embodiment of the present invention will be described. In the above-described first embodiment, the print functions are restricted in the terminal server 101. However, if restrictions are imposed on the print functions except for a predetermined print function so that the predetermined print function is performed, the printer drivers 317 and 318 of the client terminal 102 may not support the predetermined print function. Therefore, the second embodiment describes how to deal with the above-described contradiction (collision and/or prohibition) between the print-function settings.

Thus, the main difference between the first and second embodiments is processing performed when the contradiction arises between the print-function settings. Therefore, in the description of the second embodiment, the same components as those of the first embodiment are designated by the same reference numerals as those used in FIGS. 1 to 22 so that detailed descriptions of the same components are omitted.

Further, the second embodiment shows an example where the printer driver 317 of the client terminal 102 issues a request to restrict the print function to "duplex printing" and selects a sheet which is not ready for "duplex printing", e.g., a transparency.

Figure 23:
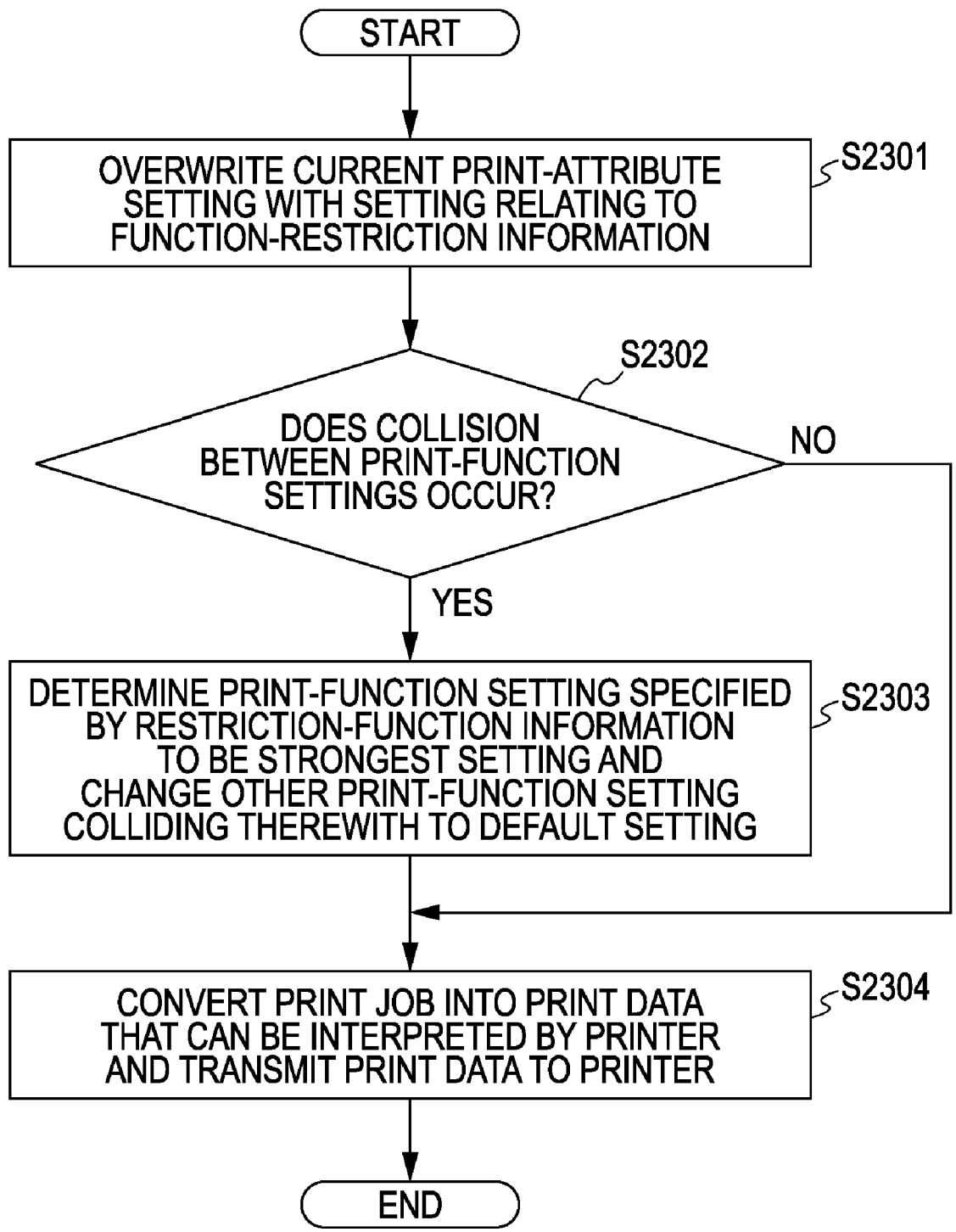
FIG. 23 is a flowchart illustrating example operations performed by the printer driver, so as to perform the function-restriction processing according to a second embodiment of the present invention.

FIG. 23 is a flowchart illustrating example operations performed by the printer driver 317, so as to perform the function-restriction processing. Further, in FIG. 23, steps S2301, S2302, and S2303 are performed at the part corresponding to step S1908 shown in FIG. 19, and step S2304 is performed at the part corresponding to step S1909.

First, at step S2301, the printer driver 317 stored in the client terminal 102 overwrites data on the current settings (print-attribute settings) on the printer driver 318 with data on settings relating to the function-restriction-job-ticket data 2101 (the function-restriction information 901). The above-described operation performed at step S2301 can be achieved, as is the case with step S1503 shown in FIG. 15.

Next, at step S2302, the printer driver 317 determines whether or not the collision between the print-function settings occurs on the basis of a prohibition condition set in advance, for example. If the determination result shows that the collision between the print-function settings does not occur, the processing skips step S2303 and advances to step S2304 at which the printer driver 317 converts the print-job data into print data that can be interpreted by the printer 103a and transmits the print data to the printer 103a. The printer 103a renders the print data, and prints and outputs the print data. After that, the processing procedures shown in the flowchart of FIG. 23 are terminated.

On the other hand, if it is determined that the collision between the print-function settings occurs at step S2303, the processing advances to step S2303 at which the printer driver 317 performs the following processing. That is to say, the printer driver 317 determines the set value of the print function specified in the function-restriction-job-ticket data 2101 (the function-restriction information 901) to be the strongest set value (makes the print function a higher priority than other print functions), and determines the other print function colliding with the specified print function to be a default setting. For example, if restrictions are imposed on the print functions so that the print function "duplex printing" is performed, and the sheet-type setting of the printer driver 317 indicates "transparency", the printer driver 317 performs the following processing.

Namely, the printer driver 317 determines the set value of the print function "duplex printing" to be the strongest set value, and changes the sheet-type setting "transparency" into the default setting "ordinary paper". If the preset settings on the printer driver 317 are selected, the printer driver 317 cancels the preset settings during the above-described processing corresponding to step S2302.

Then, the processing advances to step S2304 at which the printer driver 317 converts the print-job data into print data that can be interpreted by the printer 103a, and transmits the print data to the printer 103a. The printer 103a renders the print data, and prints and outputs the print data. After that, the processing procedures shown in the flowchart of FIG. 23 are terminated. Thus, in the second embodiment, a processing unit is achieved by performing the processing procedures shown in the flowchart of FIG. 23.

Thus, in the second embodiment, if the collision (contradiction) between the print-function settings occurs due to the restriction imposed on the print functions so that the predetermined print function is performed, the printer driver 317 makes the predetermined print function a higher priority than the other print function and changes the set value of the other print function to the default-set value. Therefore, even though the contradiction (collision) between the print-function settings occurs, the print-function restriction can be appropriately achieved as soon as possible.

Although the processing procedures described in the second embodiment are exemplarily performed in the printer driver 317, the same processing procedures can also be performed in the other printer driver, that is, the printer driver 318, which also reduces the contradiction (collision) between the print-function settings.

Third Embodiment

Next, a third embodiment of the present invention will be described. The third embodiment describes how to deal with the contradiction (collision) between the print-function settings according to a method different from that used in the second embodiment. Thus, the main difference between the first, second, and third embodiments is the processing performed when the contradiction between the print-function settings occurs. Therefore, in the description of the third embodiment, the same components as those of the first and second embodiments are designated by the same reference numerals as those used in FIGS. 1 to 23 so that detailed descriptions of the same components are omitted.

Figure 24:
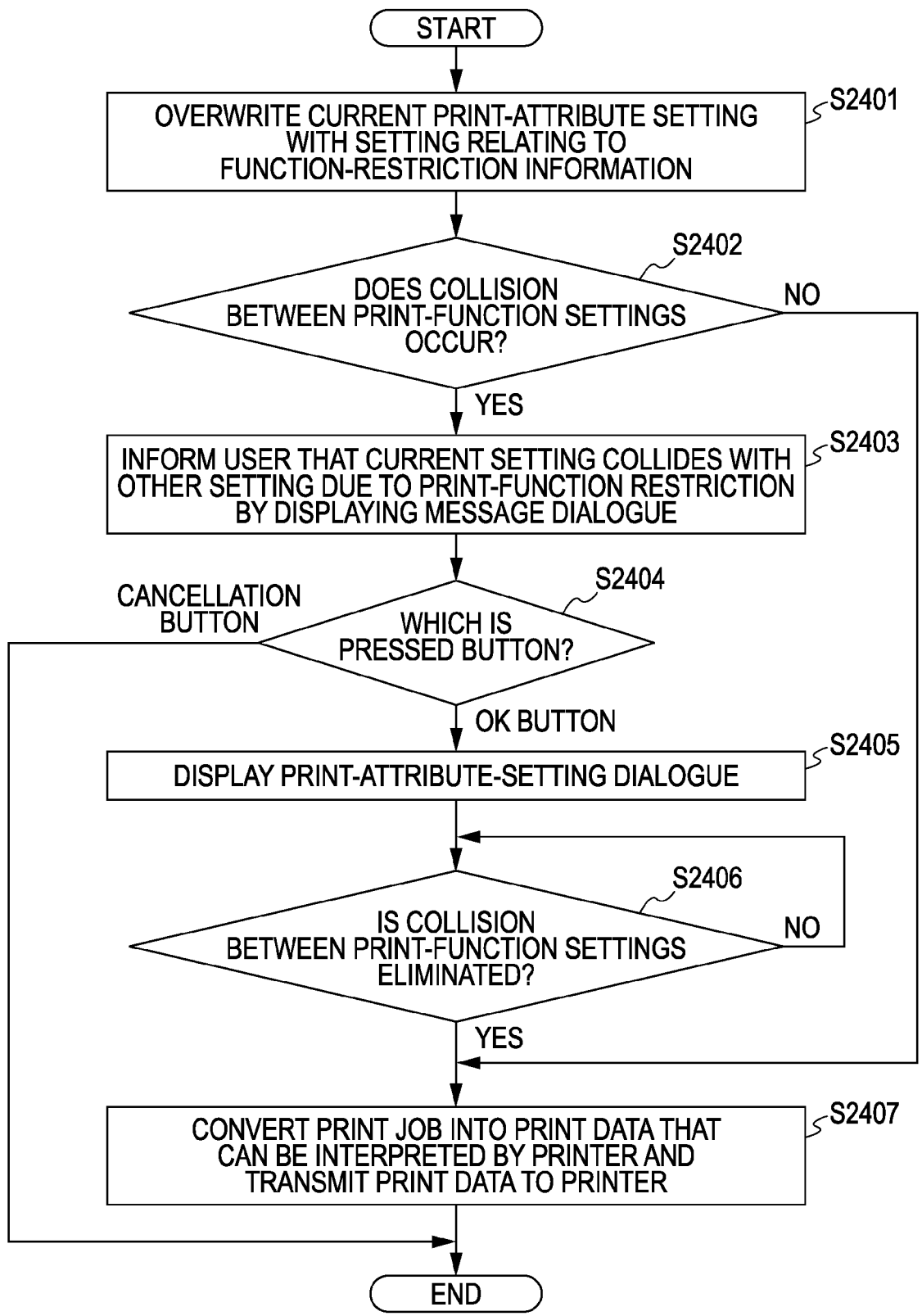
FIG. 24 is a flowchart illustrating example operations performed by the printer driver, so as to perform the function-restriction processing according to a third embodiment of the present invention.

The third embodiment also shows the example where the printer driver 317 issues the request to impose restrictions on the print functions so that the "duplex printing" is performed and selects the sheet which is not ready for the "duplex printing", e.g., the transparency. FIG. 24 is a flowchart illustrating example operations performed by the printer driver 317, so as to perform the function-restriction processing. Further, steps S2401, S2402, S2403, S2405, and S2406 are performed at the part corresponding to step S1908 shown in FIG. 19, and step S2407 is performed at the part corresponding to step S1909.

First, at step S2401, the printer driver 317 stored in the client terminal 102 overwrites data on the current settings (print-attribute settings) on the printer driver 318 with data on settings relating to the function-restriction-job-ticket data 2101 (the function-restriction information 901). The above-described operation performed at step S2401 can be achieved, as is the case with step S1503 shown in FIG. 15.

Next, at step S2402, the printer driver 317 determines whether or not the collision between the print-function settings occurs on the basis of a prohibition condition set in advance, for example. If the determination result shows that the collision between the print-function settings does not occur, the processing skips steps S2403 to S2406 and advances to step S2407 at which the printer driver 317 converts the print-job data into print data that can be interpreted by the printer 103a and transmits the print data to the printer 103a. The printer 103a renders the print data, and prints and outputs the print data. After that, the processing procedures shown in the flowchart of FIG. 24 are terminated.

On the other hand, if it is determined that the collision between the print-function settings occurs at step S2402, the processing advances to step S2403 at which the printer driver 317 informs the user that the current settings on the printer driver 317 are invalid due to the print-function restriction through a message (shows the message on the display of the client terminal 102).

Figure 25:
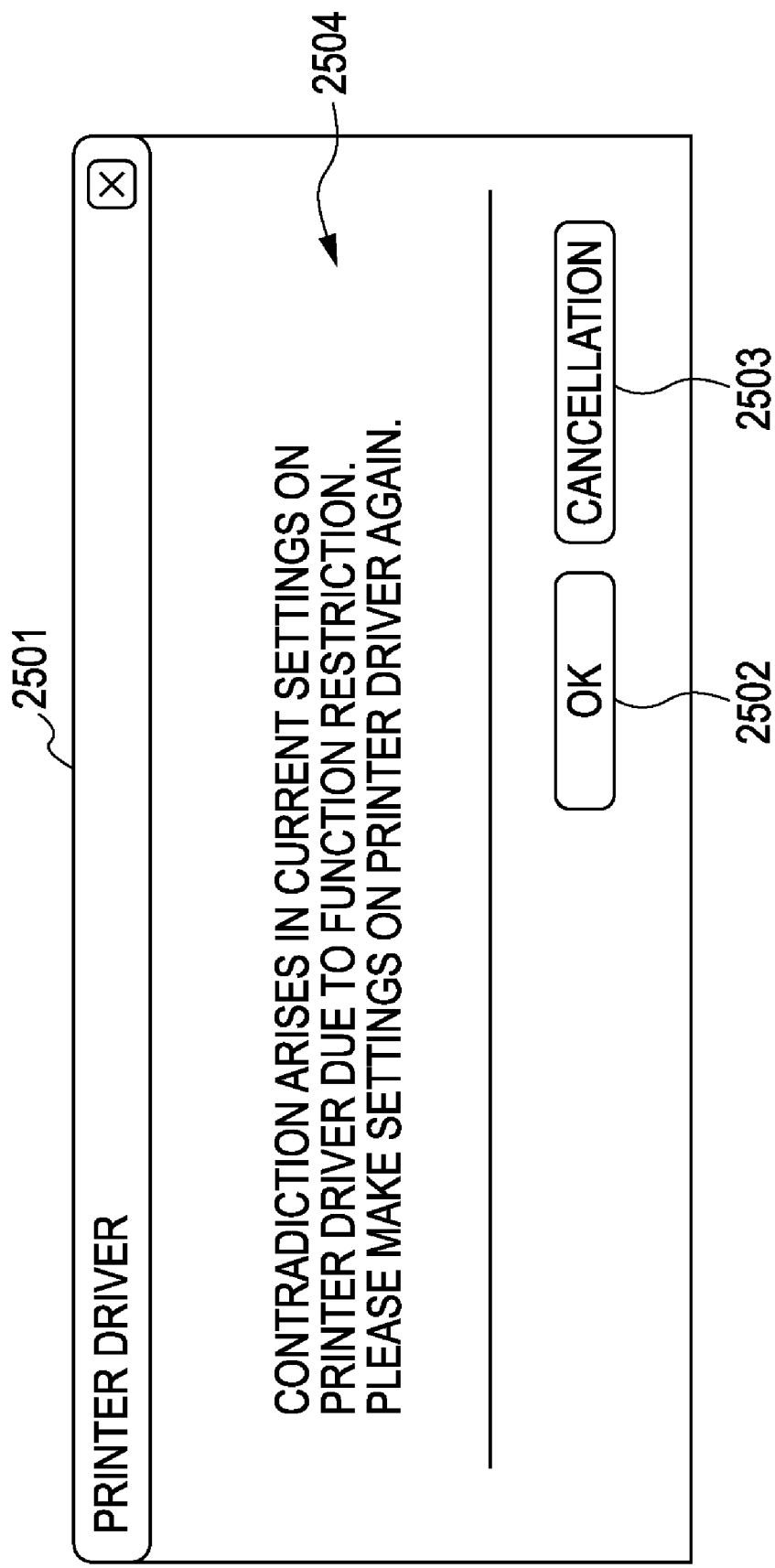
FIG. 25 is an example message dialogue showing that the current settings on the printer driver are invalid according to the third embodiment.

FIG. 25 is an example message dialogue showing that the current settings on the printer driver 317 are invalid. In FIG. 25, a message 2504, an OK button 2502, and a cancellation button 2503 are displayed on a message dialogue 2501. If the user wishes to change the print settings on the printer driver 317 and continue the printing, the user presses the OK button 2502. On the other hand, if the user wishes to cancel the printing, the user presses the cancellation button 2503.

Next, the printer driver 317 determines which of the OK button 2502 and the cancellation button 2503 is pressed, at step S2406. If the determination result shows that the cancellation button 2503 is pressed, the processing procedures shown in the flowchart of FIG. 24 are terminated. On the other hand, if the OK button 2502 is pressed, the processing advances to step S2405 at which the printer driver 317 shows a print-attribute-setting dialogue on the display of the client terminal 102.

Next, at step S2406, the printer driver 317 waits until the collision between the print-function settings is eliminated on the basis of an operation performed by the user for the print-attribute-setting dialogue shown at step S2405. Then, after the above-described collision is eliminated, the processing advances to step S2407 at which the printer driver 317 converts the print-job data into print data that can be interpreted by the printer 103a, and transmits the print data to the printer 103a. The printer 103a renders the print data, and prints and outputs the print data. Then, the processing procedures shown in the flowchart of FIG. 24 are terminated.

Figure 26:
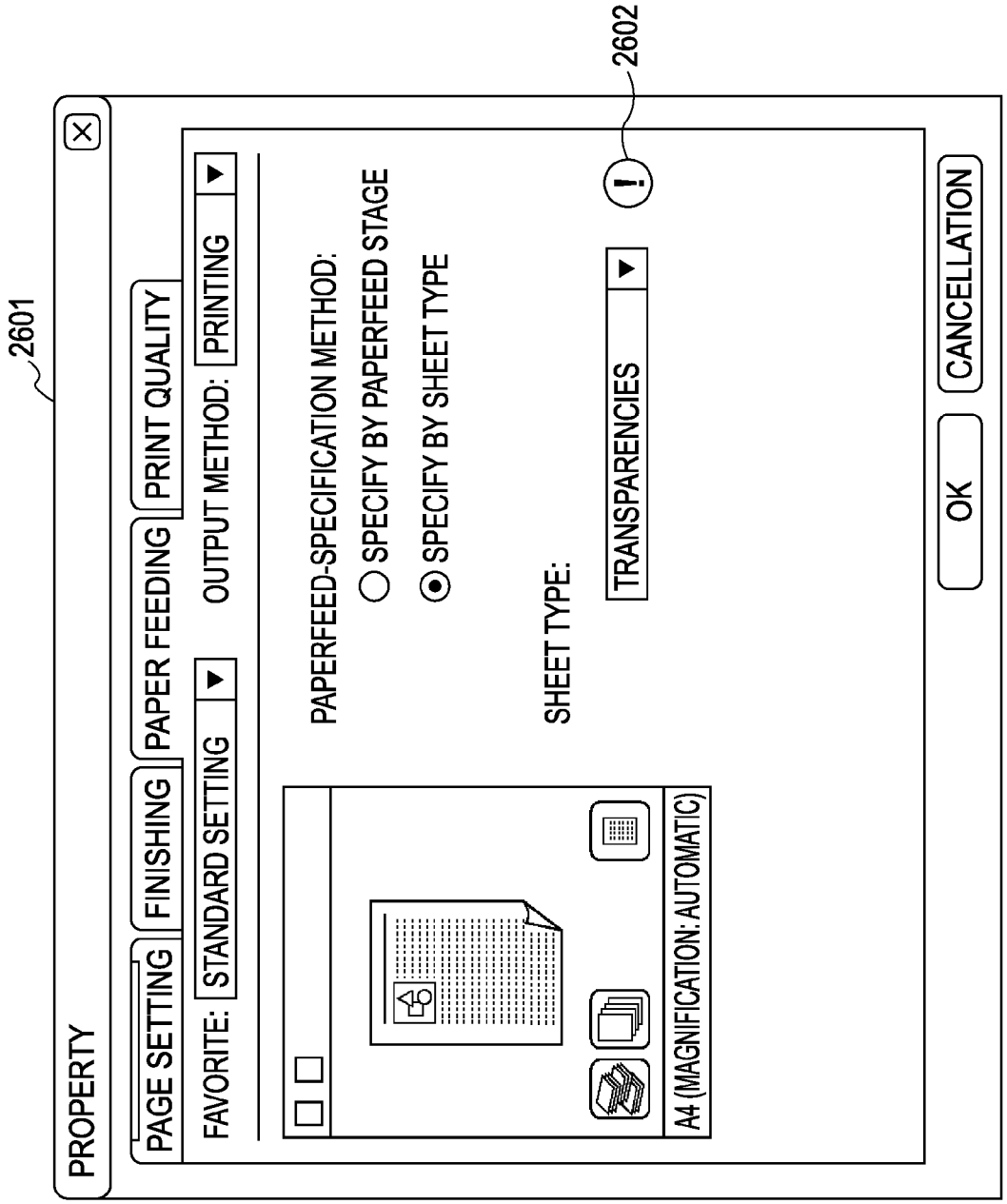
FIG. 26 shows an example print-attribute-setting dialogue firstly displayed according to the third embodiment.

FIG. 26 shows an example print-attribute-setting dialogue displayed for the first time, at step S2405. According to a print-attribute-setting dialogue 2601 shown in FIG. 26, a collision between the type-of-sheet-to-be-fed settings occurs. Therefore, the user selects a paperfeed tab provided on the print-attribute-setting dialogue 2601. Since the currently set sheets are transparencies, a mark 2602 indicating that the collision between the print-function settings occurs is shown in the vicinity of a control box provided to set the sheet type. The user switches the sheet type to another sheet type by performing an operation for the sheet-type-setting-control box.

Figure 27:
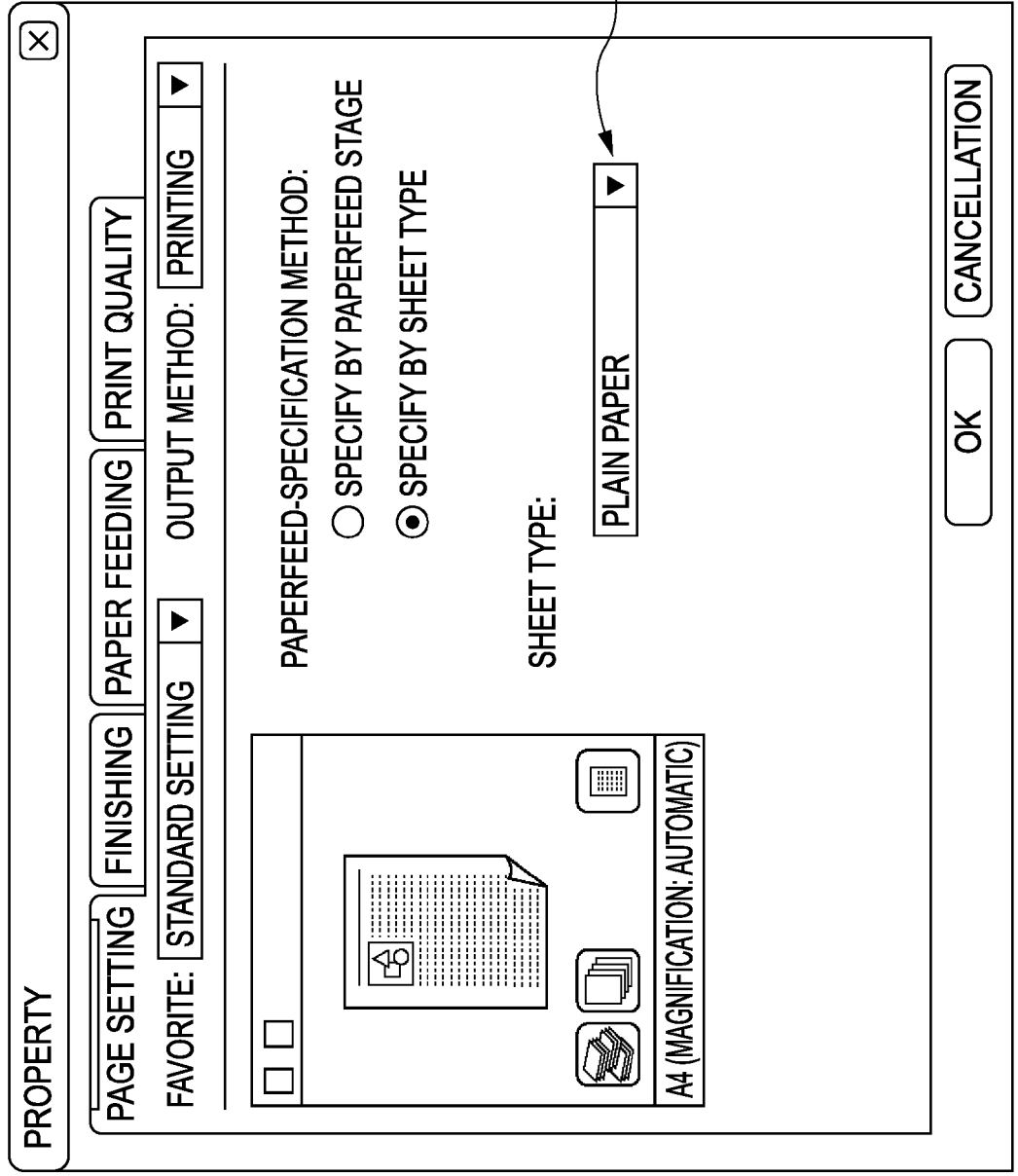
FIG. 27 shows an example print-attribute-setting dialogue shown after the print-function switching is performed according to the third embodiment.

FIG. 27 shows an example of the print-attribute-setting dialogue shown after the print-function switching is performed. As shown in FIG. 27, the user switches the sheet type from "transparency" to "plain paper" by operating a sheet-type-setting-control box 2701. Thus, in the third embodiment, a processing unit is achieved by performing the processing procedures shown in the flowchart of FIG. 24.

According to the third embodiment, if the contradiction (collision) between the print-function settings occurs due to a restriction imposed on the print functions so that a predetermined print function is performed, the printer driver 317 informs the user of the contradiction. Then, the printer driver 317 makes a change in the print-function settings colliding with each other on the basis of an operation performed by the user. Therefore, even though the contradiction (collision) between the print-function settings occurs, the print functions can be appropriately restricted as soon as possible.

In the third embodiment, the above-described processing procedures are exemplarily performed in the printer driver 317. However, the contradiction (collision) between the print-function settings can be avoided by performing the same processing procedures in the other printer driver, that is, the printer driver 318.

Fourth Embodiment

Next, a fourth embodiment of the present invention will be described. In the above-described first embodiment, when the print-job data to which the job-ticket data is added should be processed by the printer driver 317 provided to process the OS-drawing-print data, the function-restriction-job-ticket data 2101 and the print-job data are associated with each other by using the job ID.

On the other hand, the fourth embodiment shows an example where the print functions of the printer driver 317 provided to process the OS-drawing-print data are restricted without using the job ID. Thus, the main difference between the first and fourth embodiments is that the methods of restricting the print functions of the printer driver 317, the methods being used in the individual first and second embodiments, are partly different from each other. Therefore, the same components described in the fourth embodiment as those described in the first embodiment are designated by the same reference numerals as those used in FIGS. 1 to 22, for example, so that the same components as those of the first embodiment will not be described in detail.

Figure 28:
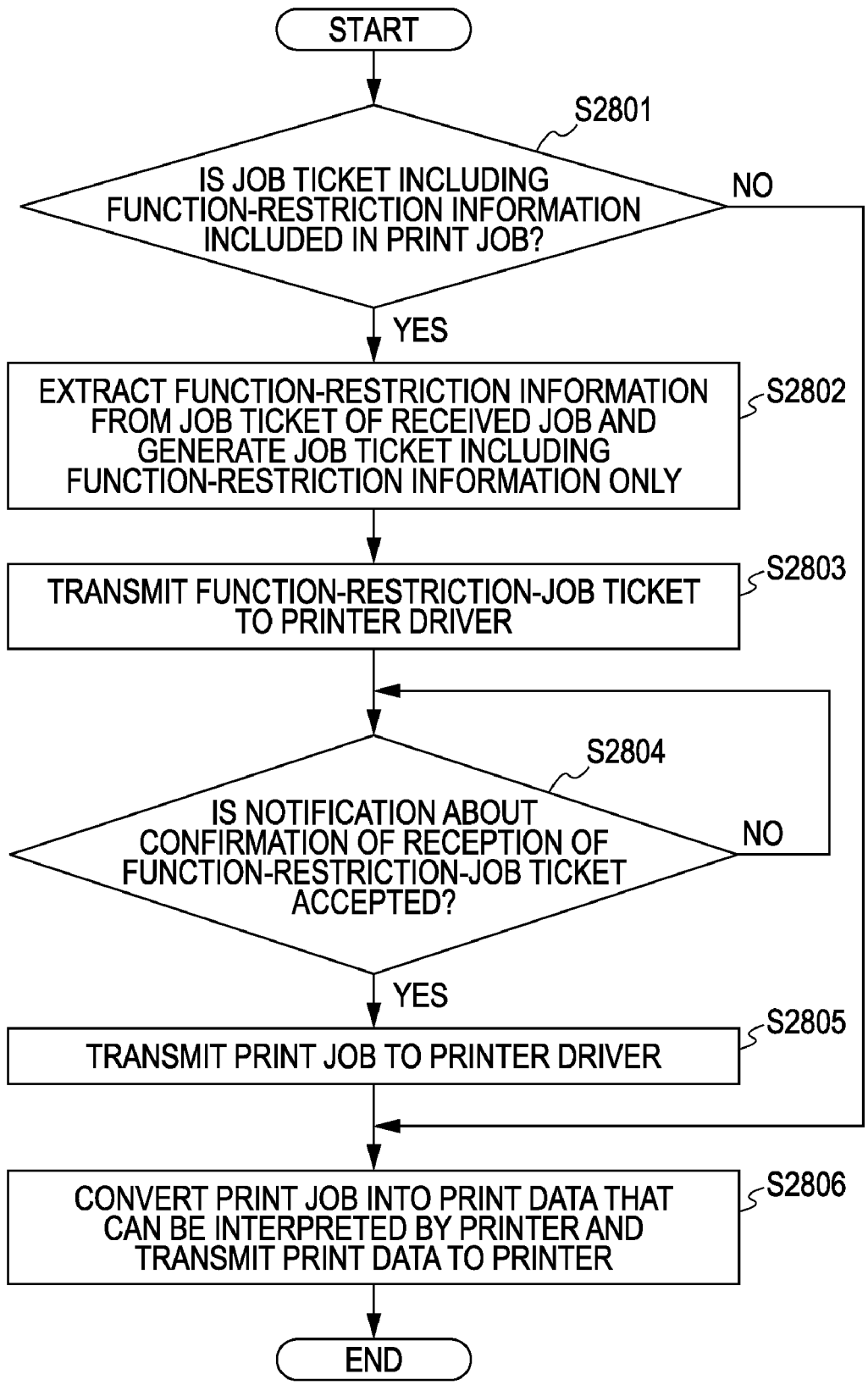
FIG. 28 is a flowchart showing example operations performed by the client terminal, so as to perform the function-restriction processing according to a fourth embodiment of the present invention.

FIG. 28 is a flowchart showing example operations performed by the client terminal 102, so as to perform the function-restriction processing. FIG. 28 mainly shows operations performed when the printer driver functioning as the output destination of the print-job data is the printer driver 317 provided to process the OS-drawing-print data. In the fourth embodiment, the processing procedures shown in the flowchart of FIG. 28 are performed in place of those shown in the flowchart of FIG. 19.

First, at step S2801, the print-control module 310 determines whether or not job-ticket data including data on the content of the function-restriction information 901 is added to the print-job data. The determination can be made as is the case with step S1408 shown in FIG. 14, for example.

If the determination result shows that the above-described job-ticket data is not added to the print-job data, the processing advances to step S2806. At step S2806, the OS-drawing-conversion module 313 converts the general-purpose-format-print data 307 included in the print-job data into the OS-drawing-print data, and transmits the OS-drawing-print data to the printer driver 317 via the spooler 315. The printer driver 317 converts the print-job data including the OS-drawing-print data into print data that can be interpreted by the printer 103a, and transmits the print data to the printer 103a. The printer 103a renders the print data, and prints and outputs the rendered print data. Then, the processing procedures shown in the flowchart of FIG. 28 are terminated.

On the other hand, if it is determined that the job-ticket data including the data on the content of the function-restriction information 901 is added to the print-job data, at step S2801, the processing advances to step S2802 at which the print-control module 310 extracts the function-restriction information 901 from the job-ticket data added to the received print-job data and generates job-ticket data (function-restriction-job-ticket data) only including the function-restriction information 901. More specifically, the job-ticket data shown in FIG. 12, for example, is generated by performing the processing procedure corresponding to step S2802.

Next, at step S2803, the print-control module 310 transmits the function-restriction-job-ticket data to the printer driver 317. Upon receiving the function-restriction-job-ticket data, the printer driver 317 transmits a reception-confirmation notification indicating the reception of the function-restriction-job-ticket data to the print-control module 310.

Next, at step S2804, the print-control module 310 waits until the reception-confirmation notification is transmitted from the printer driver 317. When the reception-confirmation notification is received, the processing advances to step S2805 and the print-control module 310 transmits the print-job data to the printer driver 317 via the OS-drawing-conversion module 313.

Next, at step S2806, the printer driver 317 converts the transmitted print-job data into print data that can be interpreted by the printer 103a on the basis of the received function-restriction-job-ticket data, and transmits the print data to the printer 103a. The printer 103a renders the print data, and prints and outputs the print data. Then, the processing procedures shown in the flowchart of FIG. 28 are terminated.

Thus, in the fourth embodiment, a second output unit is achieved by performing the processing procedure corresponding to step S2803 shown in FIG. 28, and a conversion unit is achieved by performing the processing procedure corresponding to step S2805. A processing unit of the second printer driver is achieved by performing the processing procedures corresponding to steps S2803 and S2806.

Thus, in the fourth embodiment, the print-control module 310 receives the notification transmitted from the printer driver 317, the notification indicating the reception of the function-restriction-job-ticket data, and transmits the print-job data to the printer driver 317 via the OS-drawing-conversion module 313. Consequently, it becomes possible to obtain the same advantage as that obtained through the first embodiment without using the job ID. The above-described configurations used for the second and third embodiments can also be used for the fourth embodiment.

Fifth Embodiment

Next, a fifth embodiment of the present invention will be described. In the fifth embodiment, part of the processing procedures performed by the print-control module 310 used in the first embodiment is performed by the OS-drawing-conversion module 313. Thus, the main difference between the fifth embodiment and the first embodiment is that the entity for executing the processing procedures of the fifth embodiment is partly different from that of the first embodiment. Therefore, in the description of the fifth embodiment, the same components described in the fifth embodiment as those described in the first embodiment are designated by the same reference numerals as those used in FIGS. 1 to 22, for example, so that the detailed description of the same components as those of the first embodiment is omitted.

Figure 29:
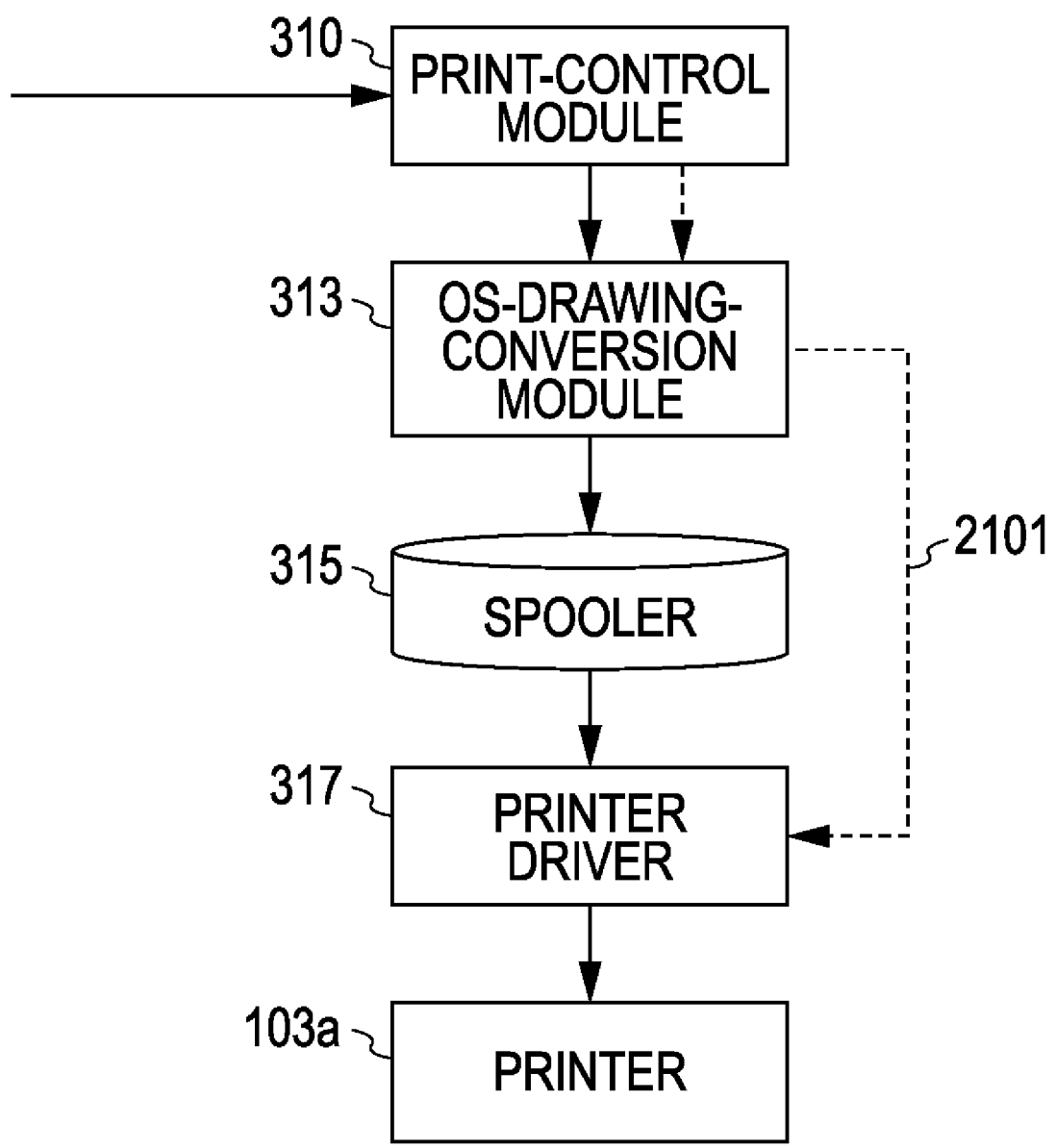
FIG. 29 shows example flows of the print-job data and the function-restriction-job-ticket data according to a fifth embodiment of the present invention.

FIG. 29 shows example flows of the print-job data and the function-restriction-job-ticket data. In FIG. 29, the print-job data to which the job-ticket data including data on the content of the function-restriction information 901 is added is transmitted from the print-control module 310 to the OS-drawing-conversion module 313.

The OS-drawing-conversion module 313 extracts the function-restriction information 901 from the job-ticket data added to the transmitted print-job data, and generates function-restriction-job-ticket data. Further, the OS-drawing-conversion module 313 generates job-ID data. Then, the OS-drawing-conversion module 313 adds the job-ID data to the function-restriction-job-ticket data, and transmits the function-restriction-job-ticket data to the printer driver 317. Further, the OS-drawing-conversion module 313 converts the transmitted print-job data into print-job data including OS-drawing-print data, adds the job-ID data to the print-job data, and transmits the print-job data to the printer driver 317 via the spooler 315. The other operations are the same as those performed in the first embodiment.

Thus, in the fifth embodiment, the processing for the "job-ticket data including data on the content of the function-restriction information 901" added to the print-job data transmitted from the terminal server 101 is performed by the OS-drawing-conversion module 313 in place of the print-control module 310. Further, the processing procedures performed by the OS-drawing-conversion module 313, so as to restrict the print functions is not restricted to those described in the above-described embodiments, so long as at least one of steps S1902, S1903, S1904, and S1906 that are shown in FIG. 19 is performed by the OS-drawing-conversion module 313, for example.

Other Embodiments

Each of the units included in the print systems of the above-described embodiments of the present invention and each of the steps of the print-control methods of the above-described embodiments of the present invention can be achieved by an operating program stored in a random-access memory (RAM) and/or a read-only memory (ROM) of a computer. The program and/or a computer-readable recording medium storing the program constitutes another embodiment of the present invention.

Further, each of a system, an apparatus, a method, a program, a storage medium, etc. may constitute another embodiment of the present invention. More specifically, the present invention can be used for a system including plural units, or an apparatus only including a single unit.

Further, program code of software implementing the functions of the above-described embodiments (e.g., the program code corresponding to the flowcharts of FIGS. 6, 8, 10, 14, 15, 19, 23, 24, and 28) is supplied to the system and/or the apparatus directly and/or remotely. Then, a computer of the system and/or the apparatus reads and executes the supplied program code so that the functions of the above-described embodiments can be achieved, which constitutes another embodiment of the present invention.

Therefore, the program code itself installed in the computer, so as to achieve functional processing of the present invention by the computer, also achieves another embodiment of the present invention. Namely, a computer program itself provided to achieve the functional processing can constitute another embodiment of the present invention.

In that case, the above-described computer program may be object code, a program executed by an interpreter, script data supplied to an operating system (OS), etc., so long as the computer program has program functions.

A recording medium provided to supply the program may be, for example, a floppy (registered trademark) disk, a hard disk, an optical disk, a magneto-optical disk, a magneto-optical disk (MO), a compact disk (CD)-read only memory (ROM), a CD-recordable (R), a CD-rewritable (RW), etc. The above-described recording medium may further be a magnetic tape, a nonvolatile memory card, a ROM, a digital-versatile disk (DVD) including a DVD-ROM and a DVD-R, etc.

Further, the program may be supplied in the following methods. For example, a user accesses a home page established on the Internet by using a browser of a client computer. Then, the user downloads the computer program itself of the present invention from the home page and/or compressed file data including data on an automatic-install function to a recording medium such as a hard disk.

Further, the program can be supplied by dividing program code generating the program of the present invention into plural file-data items and downloading the file-data items from different home pages. Namely, a WWW server provided to download program-file-data items used to achieve the functional processing of the present invention by using a computer to plural users also constitutes another embodiment of the present invention.

Further, the program of the present invention may be encoded and stored in storage mediums such as CD-ROMs distributed to users. Then, key information used to decode the encoded program may be downloaded from the home page to a user satisfying predetermined conditions via the Internet. Through the use of the downloaded key information, the encoded program can be executed and installed in a computer so that the program is supplied to the system and/or the apparatus.

Further, not only by the computer reading and executing the read program, but also by the computer executing part of or the entire process utilizing an OS, etc. running on the computer based on instructions of the program, the functions of the above-described embodiments may be achieved.

Further, the program read from the recording medium may be written into a memory of a function-expansion board inserted into the computer and/or a function-expansion unit connected to the computer. Then, a central processing unit (CPU), etc. of the function-expansion board and/or the function-expansion unit may execute part of or the entire process based on instructions of the program so that the functions of the above-described embodiments are achieved.

An embodiment of the present invention eliminates the need to make settings relating to the restriction of print functions through the printer driver of each client-terminal device, which makes it possible to restrict the print functions by making settings once through the printer driver of a server device. Consequently, it becomes easier to restrict the print functions of a print system in which a printer driver is installed in each of a server device and a client-terminal device than in the past.

While the present invention has been described with reference to the above-described exemplary embodiments, it is to be understood that the technical scope of the present invention is not restricted to the above-described exemplary embodiments. Namely, the present invention can be achieved in various forms without leaving the technical ideas and/or the main characteristics thereof. The scope of the following claims is to be accorded the broadest interpretation so as to encompass all modifications and equivalent structures and functions.

This application claims the benefit of Japanese Patent Application No. 2007-297122 filed on Nov. 15, 2007, which is hereby incorporated by reference herein in its entirety.

What is claimed is:

1. A print system comprising:
   a server device;
   a client-terminal device connected to the server device so that the client-terminal device and the server device can communicate with each other; and
   a print device connected to the client-terminal device so that the print device and the client-terminal device can communicate with each other,
   wherein a printer driver, installed in the server device, includes a generation unit configured to generate a print job including function-restriction information used to restrict a print function,
   wherein a printer driver, installed in the client-terminal device, includes a processing unit configured to process the print job in accordance with a restriction imposed on the print function, where the restriction is imposed based on the function-restriction information included in the print job transmitted from the server device,
   wherein the print device includes:
      a first print device configured to perform printing based on the print job; and
      a second print device configured to perform printing based on drawing-print data obtained by converting the print job,
   wherein the printer driver installed in the client-terminal device includes:
      a first printer driver configured to process the print job transmitted from the server device in its original form; and
      a second printer driver configured to process drawing-print data generated based on the print job transmitted from the server device,
   wherein the client-terminal device includes:
      an identification unit configured to identify a print device which becomes an output destination of the print job transmitted from the server device;
      a conversion unit configured to convert the print job transmitted from the server device into drawing-print data;
      a first output unit configured to output the print job to the first printer driver when the identification unit identifies the print device which becomes the output destination of the print job transmitted from the server device as the first print device; and
      a second output unit that outputs the function-restriction information included in the print job to the second printer driver and that outputs the print job to the conversion unit when the identification unit identifies the print device which becomes the output destination of the print job transmitted from the server device as the second print device,
   wherein a processing unit of the first printer driver processes the print job in accordance with the print-function restriction performed based on the function-restriction information included in the print job output from the first output unit, and
   wherein a processing unit of the second printer driver individually receives the function-restriction information output from the second output unit and the drawing-print data obtained by the conversion unit, and processes the drawing-print data in accordance with the print-function restriction performed based on the received function-restriction information.

2. The print system according to claim 1, wherein the client-terminal device includes a determining unit configured to determine whether or not the function-restriction information is included in the print job transmitted from the server device, and
   wherein when the determining unit determines that the function-restriction information is included in the print job, the processing unit processes the print job in accordance with the print-function restriction performed based on the function-restriction information.

3. The print system according to claim 1, wherein the client-terminal device includes:
   a first addition unit configured to add an ID to the drawing-print data converted from the print job through the conversion unit; and
   a second addition unit configured to add the ID added by the first addition unit to the function-restriction information output from the second output unit, and
   wherein the processing unit of the second printer driver individually receives the drawing-print data to which the ID is added and the function-restriction information to which the ID is added.

4. The print system according to claim 1, wherein, upon receiving the function-restriction information included in the print job transmitted from the server device, the processing unit of the second printer driver transmits a notification indicating the reception of the function-restriction information to the second output unit, and receives the drawing-print data transmitted from the output unit after transmitting the notification.

5. The print system according to claim 1, wherein when a print function is set, the print function being contradictory to the print-function restriction performed based on the function-restriction information included in the print job transmitted from the server device, the processing unit switches from the print function on which the restriction is imposed to a different print function, and process the print job.

6. The print system according to claim 1, wherein when a print function is set, the print function being contradictory to the print-function restriction performed based on the function-restriction information included in the print job transmitted from the server device, the processing unit transmits a message indicating that the contradictory print function is set to a user, and changes the set print function and processes the print job based on details on an operation performed by the user after the message is transmitted.

7. The print system according to claim 1, wherein when a print function is set, the print function being contradictory to the print-function restriction performed based on the function-restriction information included in the print job transmitted from the server device, and wherein when a preset setting is made, the processing unit cancels the preset setting and processes the print job.

8. A print-control method comprising:
generating, via a printer driver installed in a server device, a print job including function-restriction information used to restrict a print function;
transmitting the generated print job to a client-terminal device; and
processing, via a printer driver installed in the client-terminal device, the print job in accordance with restriction of the print function, where the print-function restriction is performed based on the function-restriction information included in the print job transmitted at the transmitting step
performing printing, via a first print device, based on the print job;
performing printing, via a second print device, based on drawing-print data obtained by converting the print job;
processing, via a first printer driver of the printer driver, the print job transmitted from the server device in its original form;
processing, via a second printer driver of the printer driver, drawing-print data generated based on the print job transmitted from the server device;
identifying, by the client-terminal device, a print device which becomes an output destination of the print job transmitted from the server device;
converting, by the client-terminal device, the print job transmitted from the server device into drawing-print data;
first output step of outputting, by the client-terminal device, the print job to the first printer driver when the print device is identified, which becomes the output destination of the print job transmitted from the server device as the first print device; and
second output step of outputting, by the client-terminal device, the function-restriction information included in the print job to the second printer driver and outputting the print job to be converted when the print device is identified, which becomes the output destination of the print job transmitted from the server device as the second print device,
processing, via the first printer driver, the print job in accordance with the print-function restriction performed based on the function-restriction information included in the print job output from the first output step; and
individually receiving, via the second printer driver, the function-restriction information output from the second output step and the drawing-print data obtained in the converting step, and processing the drawing-print data in accordance with the print-function restriction performed based on the received function-restriction information.

9. A client-terminal device that is connected to a server device, a first print device configured to perform printing based on a print job, and a second print device configured to perform printing based on drawing-print data obtained by converting the print job, the client-terminal device comprising:
wherein a printer driver installed in the server device comprises a generation unit configure to generate a print job including function-restrict information for restricting a print function,
wherein a printer driver installed in the client-terminal device comprises a processing unit configured to process the print job in accordance with a restriction of the print function based on the function-restriction information in the print job transmitted from the server device, and
wherein the printer driver installed in the client-terminal device includes a first printer driver for processing the print job transmitted from the server device in an original form and a second printer driver for processing the drawing-print data based on the print job transmitted from the server device;
a determination unit configure to determine a print device as an output destination of the print job transmitted from the server device;
a conversion unit configured to convert the print job transmitted from the server device into the drawing-print data;
a first output unit configured to output the print job to the first printer driver, in a case where the determination unit determines the first print device as the output destination for the print job transmitted from the server device; and
a second output unit configure to output the print job to the conversion unit while the function-restriction information in the print job to the second printer driver, in a case where the determination unit determines the second print device as the output destination for the print job transmitted from the server device,
wherein the processing unit of the first printer driver processes the print job in accordance with the restriction of the print function based on the function-restriction information in the print job transmitted from the first output unit, and
wherein the processing unit of the second printer driver receives individually the function-restriction information output from the second output unit and the drawing-print data obtained by the conversion unit and processes the drawing-print data in accordance with the restriction of the print function based on the received function-restriction information.

10. A print-control method of a client-terminal device that is connected to a server device, a first print device configured to perform printing based on a print job, and a second print device configured to perform printing based on drawing-print data obtained by converting the print job,
wherein a printer driver installed in the server device comprises a generation unit configure to generate a print job including function-restrict information for restricting a print function,
wherein a printer driver installed in the client-terminal device comprises a processing unit configured to process the print job in accordance with a restriction of the print function based on the function-restriction information in the print job transmitted from the server device, and
wherein the printer driver installed in the client-terminal device includes a first printer driver for processing the print job transmitted from the server device in an original form and a second printer driver for processing the drawing-print data based on the print job transmitted from the server device,
the method comprising:
determining a print device as an output destination of the print job transmitted from the server device;
converting the print job transmitted from the server device into the drawing-print data;

first output step of outputting the print job to the first printer driver, in a case where it is determined in the determination step that the first print device as the output destination for the print job transmitted from the server device; and second output step of outputting the print job to be converted while the function-restriction information in the print job to the second printer driver, in a case where it is determined that the second print device as the output destination for the print job transmitted from the server device, wherein the processing unit of the first printer driver processes the print job in accordance with the restriction of the print function based on the function-restriction information in the print job transmitted from the first output unit, and wherein the processing unit of the second printer driver receives individually the function-restriction information output from the second output unit and the drawing-print data obtained in the converting step and processes the drawing-print data in accordance with the restriction of the print function based on the received function-restriction information.

11. A non-transitory storage medium storing a computer program making a computer execute the print control method according to claim 10.

* * * * *